(12) United States Patent
Dickin et al.

(10) Patent No.: US 7,836,382 B2
(45) Date of Patent: Nov. 16, 2010

(54) BUFFERLESS WRITING OF DATA TO MEMORY

(75) Inventors: Fraser John Dickin, Bristol (GB); Weng Wah Loh, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1379 days.

(21) Appl. No.: 11/294,467

(22) Filed: Dec. 6, 2005

(65) Prior Publication Data

US 2006/0133160 A1    Jun. 22, 2006

(30) Foreign Application Priority Data

Dec. 7, 2004   (GB) ................................. 0426773.8

(51) Int. Cl.
*H03M 13/00* (2006.01)
(52) U.S. Cl. .................. 714/776; 714/764; 714/752
(58) Field of Classification Search ............... 714/776, 714/764, 769, 763, 718, 752, 758, 52, 704; 709/234; 370/392
See application file for complete search history.

(56) References Cited

U.S. PATENT DOCUMENTS

| | | | |
|---|---|---|---|
| 4,970,679 A * | 11/1990 | Tachibana ................... 341/122 |
| 5,901,301 A * | 5/1999 | Matsuo et al. ............... 712/212 |
| 6,173,431 B1 | 1/2001 | Rittle |
| 6,934,903 B1 * | 8/2005 | Keltcher et al. ............. 714/763 |
| 6,972,993 B2 * | 12/2005 | Conley et al. .......... 365/185.04 |
| 7,089,407 B2 * | 8/2006 | Kojima et al. ............... 712/225 |
| 7,464,174 B1 * | 12/2008 | Ngai ........................... 709/234 |
| 7,565,108 B2 * | 7/2009 | Kotola et al. ................ 455/41.2 |
| 2004/0184457 A1 * | 9/2004 | Gregorio et al. ............. 370/392 |
| 2005/0015552 A1 * | 1/2005 | So et al. ...................... 711/118 |

FOREIGN PATENT DOCUMENTS

EP    440280 A1    8/1991

\* cited by examiner

*Primary Examiner*—Fritz Alphonse

(57) ABSTRACT

This invention provides a processor for writing data contained in payload data of a data packet to memory. The processor may, in some embodiments, be a central processing unit of a memory tag. The processor does not include a write buffer. The processor may comprise a first register adapted to latch first data corresponding to a segment of the payload data; and a second register adapted to receive second data from the payload data to enable the validity of the data latched into the first register to be established before data is written to memory. A memory device, a method for writing data contained in payload data, a data packet, a method of writing data into a non-volatile memory and a memory tag may also be provided.

9 Claims, 18 Drawing Sheets

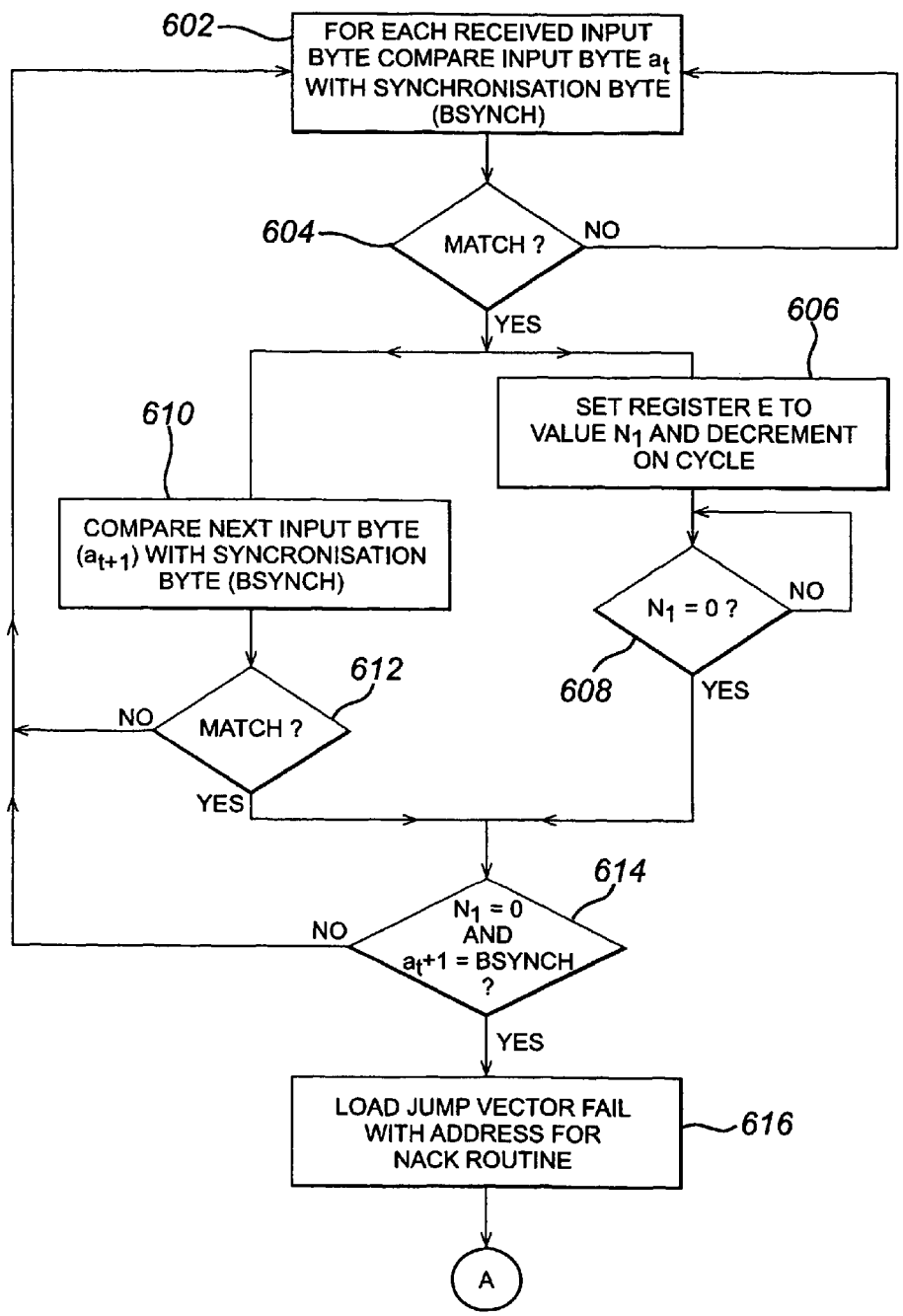

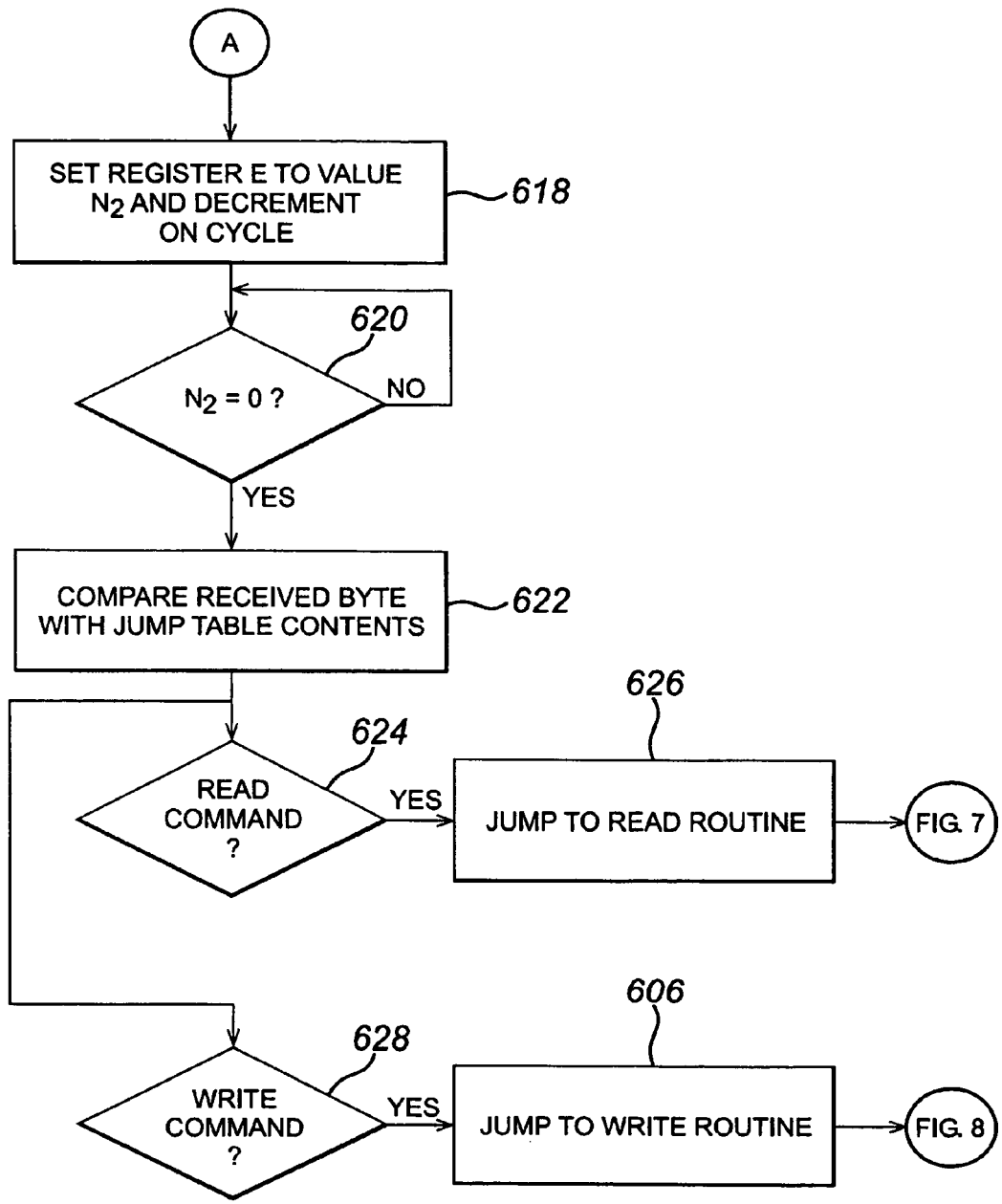
FIG. 6(CONTD.)

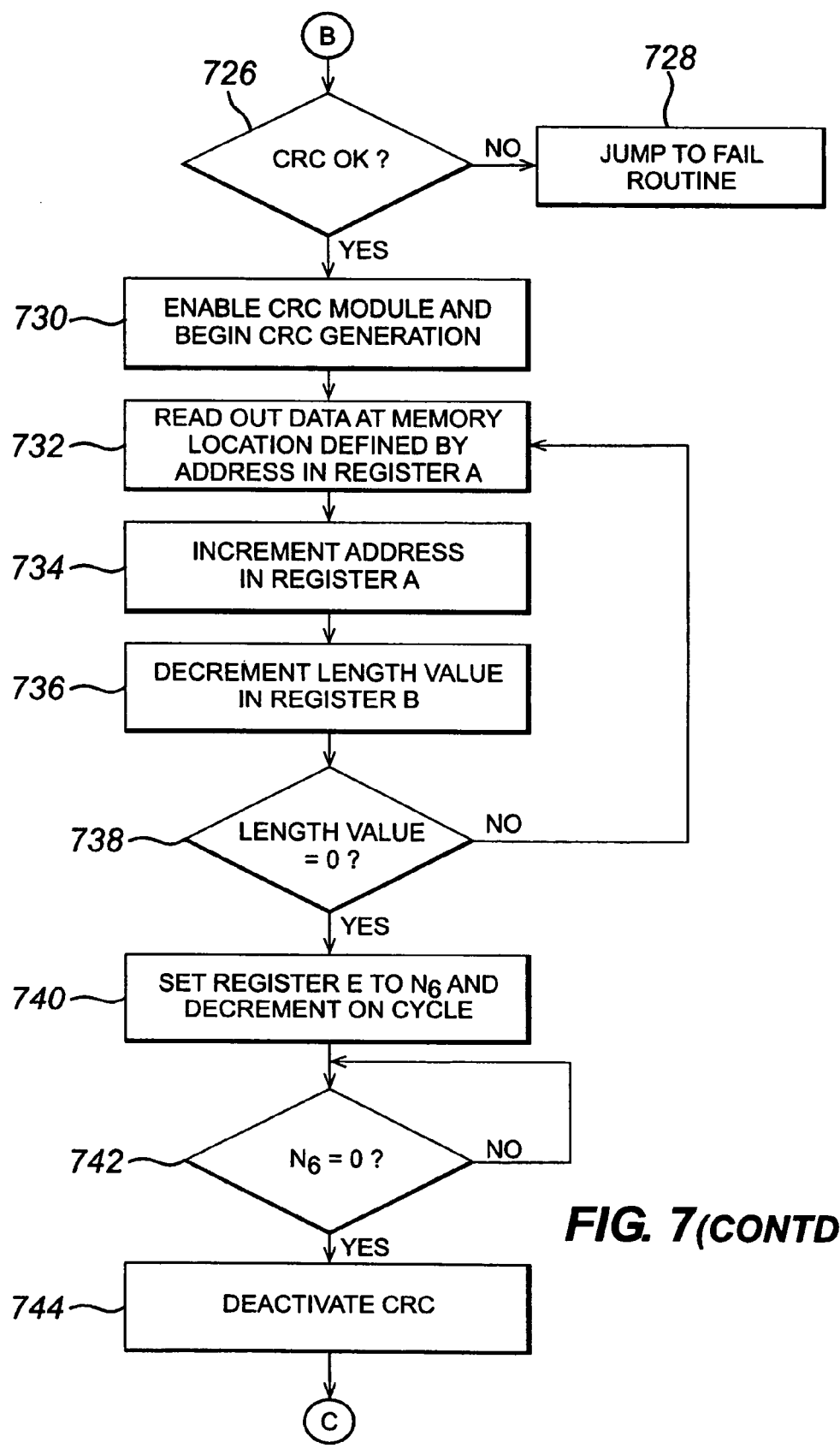
FIG. 7(CONTD.)

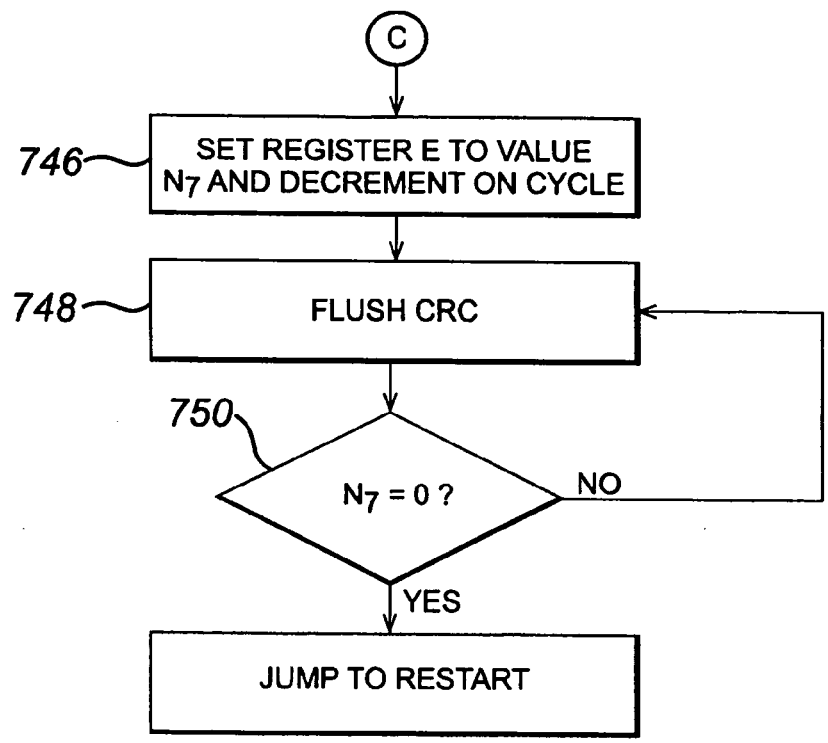
FIG. 7(CONTD.)
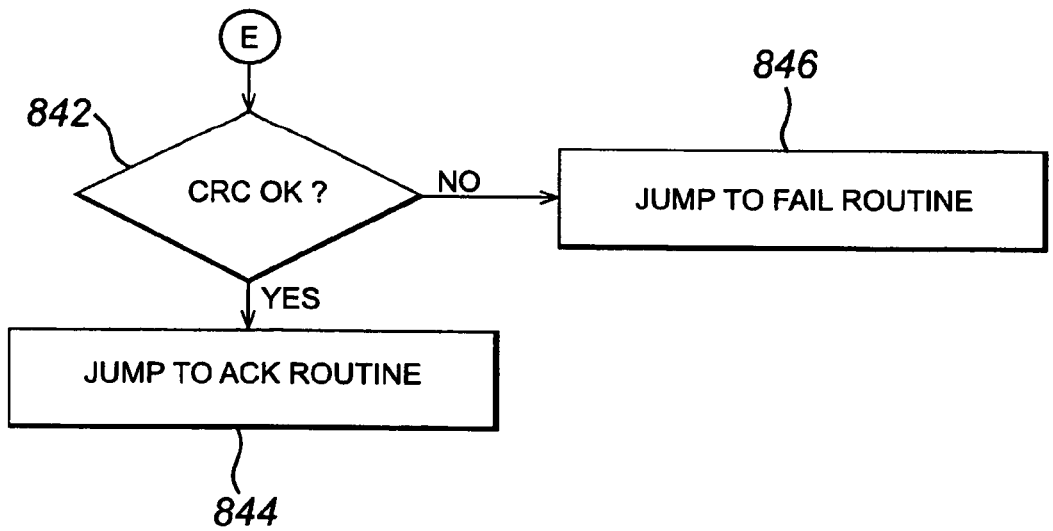
FIG. 8(CONTD.)

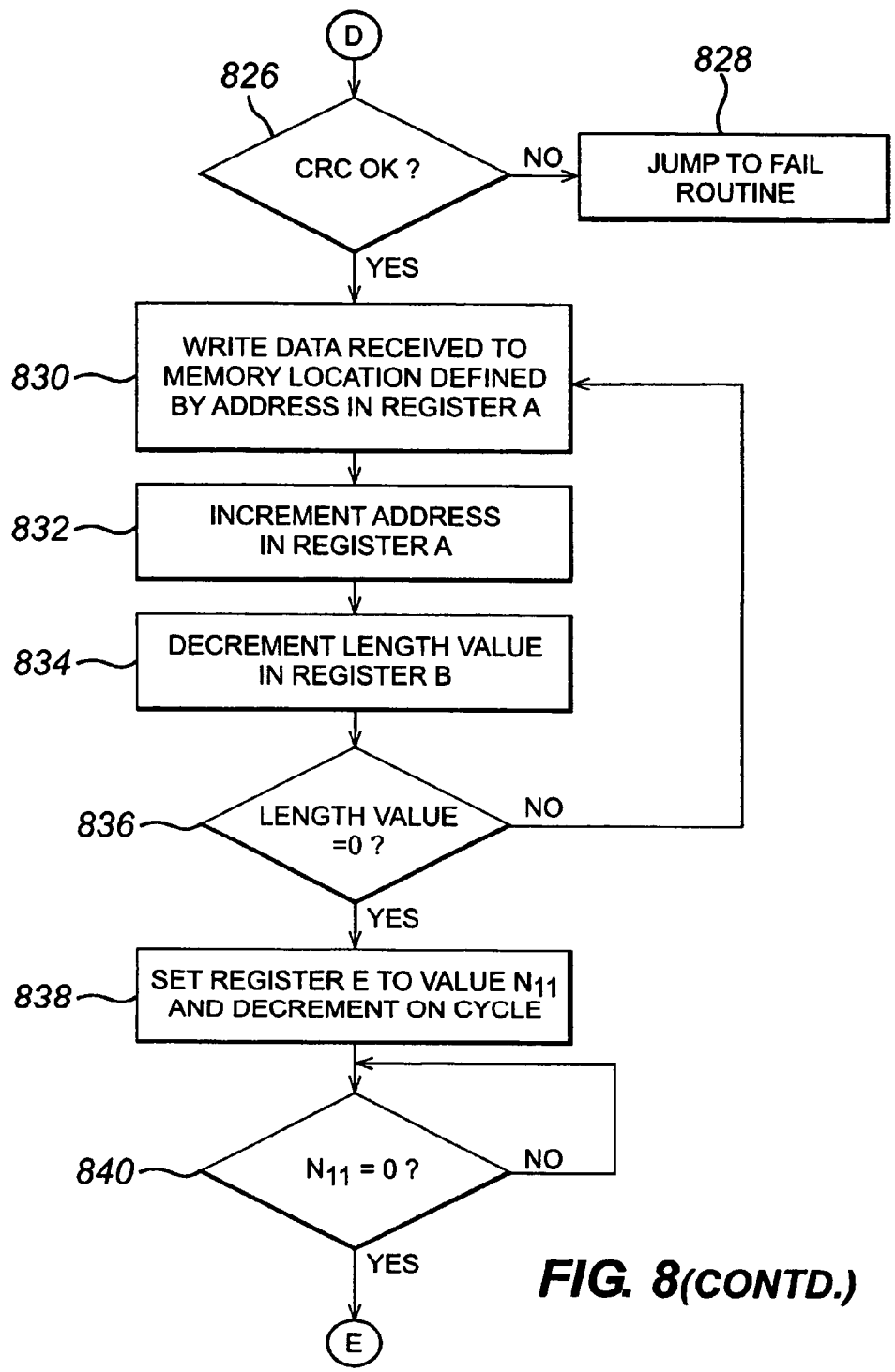
FIG. 8(CONTD.)

FIG. 11(CONTD.)
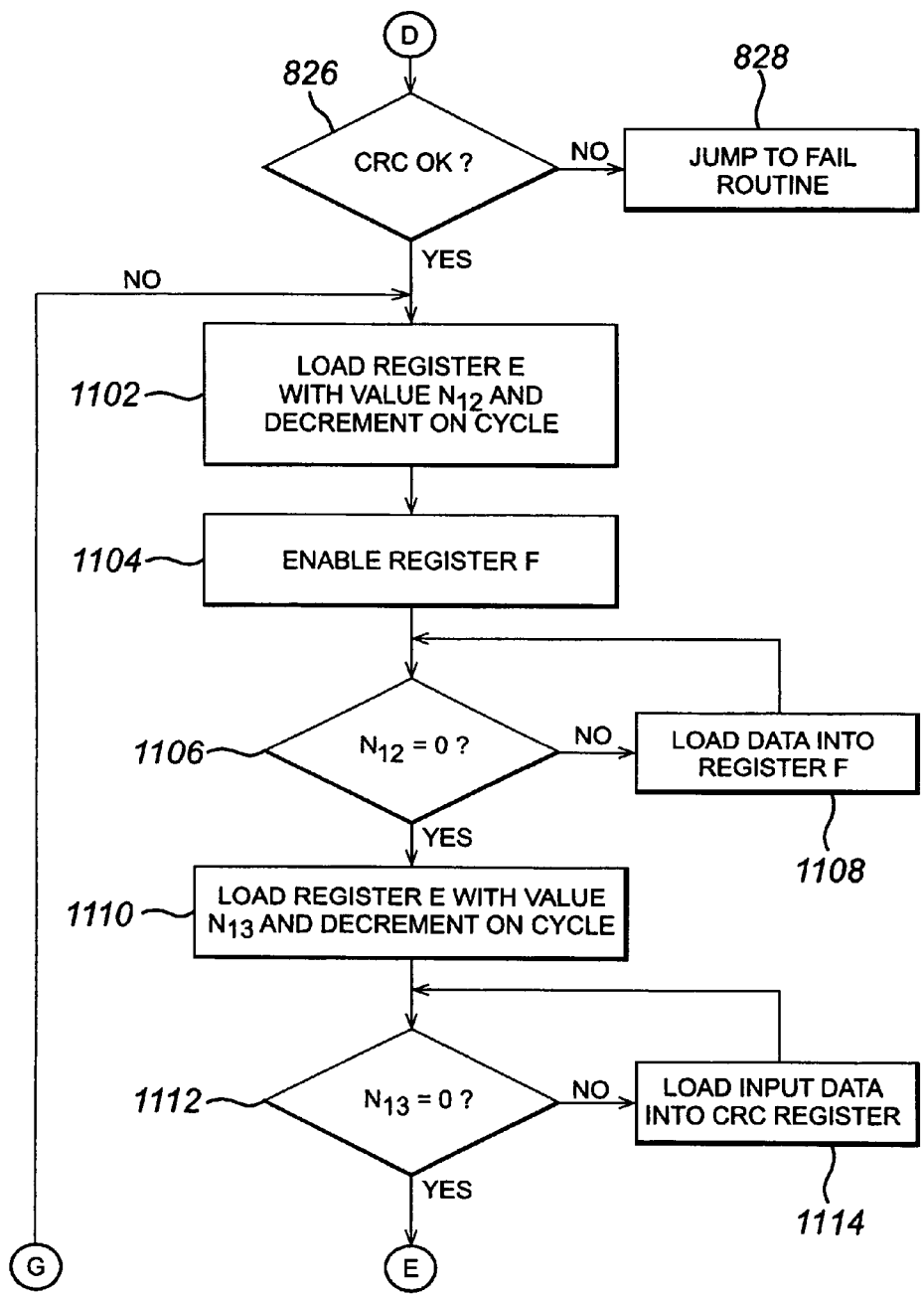

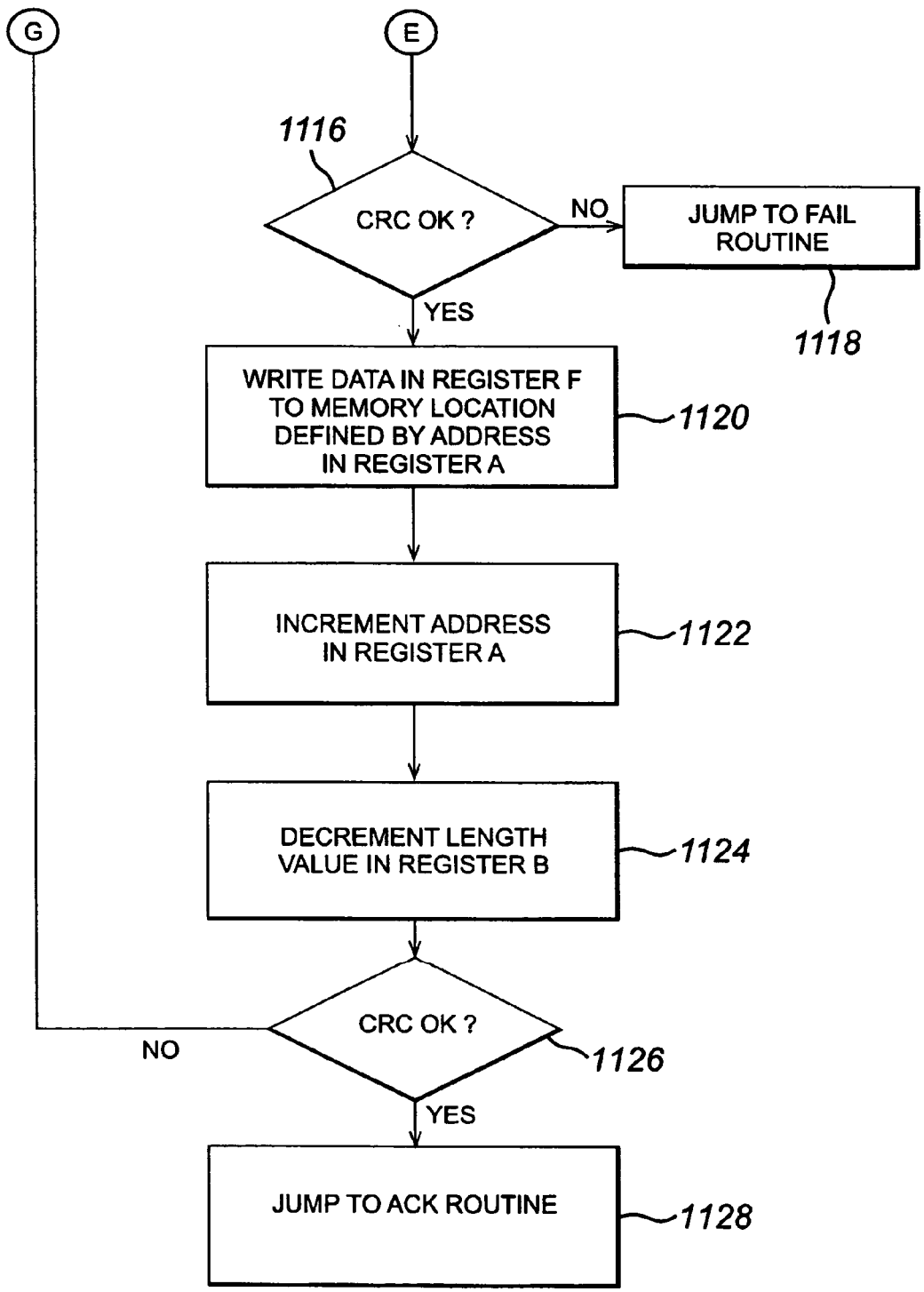
FIG. 11(CONTD.)

BUFFERLESS WRITING OF DATA TO MEMORY

FIELD OF THE INVENTION

This invention relates to data processors. More particularly, this invention relates to processors that are driven by data events/the data that they receive, and which may be utilised, for example, as the central processing unit for a memory device.

This invention also relates to an apparatus and method for writing data to memory. More particularly, this invention relates to a data processor and method for writing data to non-volatile memory, for example flash-type memory.

BACKGROUND OF THE INVENTION

Memory tags in the form of radio frequency identification (RFID) tags are well known in the prior art. RFID tags come in many forms but all comprise an integrated circuit on which, in use, data can be stored and a coil which enables it to be interrogated by a reader that also powers it by means of an inductive (wireless) link. Generally RFID tags are quite large, due to the frequency they operate at (13.56 megahertz) and the size of coil they thus require, and operate over large ranges and have very small storage capacities. Smaller RFID tags have also been developed, operating at various frequencies, but still having small storage capacity. Some RFID tags include read-only memory (ROM) and are written to at the time of manufacture, whilst others have read and write capability.

Memory tags incorporate a number of elements. These include an antenna which couples inductively with an antenna in a tag reader, an RF decoder for decoding radio frequency signals received via the antenna, a processor for processing the received signals and an area of non-volatile memory. It is desirable to maximise the area of a memory tag which can be utilised for the provision of memory as this is its purpose. Additionally, it is desirable to reduce the size of memory tags. The smaller a memory tag is, the more versatile it is.

Memory tags do not comprise an on board power supply. As already noted, they are powered via an inductive link with a memory tag reader that is brought into sufficiently close proximity with the memory tag. Hence, power consumption within the memory tag must also be kept to a minimum.

As noted, one of the elements within a memory tag is a processor. FIG. 1 illustrates the architecture and operation of a basic, general purpose, microprocessor. Microprocessor 100 comprises a bus control unit 102, an arithmetic logic unit 104, a number of registers 106 and an instruction decoder/micro sequencer 108. The instruction decoder/micro sequencer 108 is connected to pass signals to the bus control unit 102, the arithmetic logic unit 104 and the registers 106. The bus control unit 102, the arithmetic logic unit 104, the registers 106 and the instruction decoder/micro sequencer 108 are also connected for the transmission of data between them and also to the exterior of microprocessor 100.

The bus control unit 102 contains a program counter 110 and a read write signal generator 112. The program counter has the ability to increment its value by one when appropriate and to reset to zero when appropriate. The program counter enables the bus control unit 102 to control the period of time over which the bus is controlled for each action that is to be carried out. The read write signal generator 110 is operative to control the read and write lines, which are connected to the bus control unit and an associated memory, in order to inform the memory of whether a value is to be set in the memory or whether a value is to be read out from the memory. The bus control unit also indicates to the memory the address at which the value is to be set within the memory, or the address from which the value is to be read.

The arithmetic logic unit 104 is a module within the micro processor which serves to carry out arithmetical operations when told to do so by the instruction decoder/micro sequencer 108. The arithmetic operations performed by the arithmetic logic unit include addition, subtraction, multiplication and division. The registers 106 are temporary working memory. These are operative to hold, temporarily, data which is being passed to or from the arithmetic logic unit 104.

The instruction decoder/micro sequencer 108 is the control module for the micro processor. It controls each of the other modules within the micro processor in accordance with instructions it receives from memory via the data bus. This module is operative to instruct the appropriate register to latch the value currently on the data bus into that register and to hold it there. It is operative to tell the appropriate register to latch into its storage the value that is currently being output by the arithmetic logic unit 108 and it is operative to tell the program counter 110 in the bus control unit 102 either to latch the value currently on the data bus, to increment its value, or to reset to zero. The instruction decoder/micro sequencer module 108 also operates to tell the arithmetic logic unit 104 which operation should be performed upon data that is passed into it. It also controls the bus control unit 102 to carry out, as the next operation, a write routine or a read routine. This enables the bus control unit to activate the appropriate control lines. Finally, this module is operative to load the next instruction from the data bus.

As the skilled reader will appreciate, the above is a brief overview of a general purpose processor. Such processors can execute any kind of application. However, they have associated with them a number of significant disadvantages. Amongst these are inefficient data movement within the processor, complex instruction decoding and high power consumption.

Memory tags typically operate at a very high data rate, such as 10 mega bits per second (10 Mbps). Typically, general purpose processors are too big for efficient use in memory tags. Their footprint, for example in Silicon, can be larger than the available size of the memory tag in total. This is because of the associated complexity of decoding instructions and/or the requirement to process data at high rates (such as 10 Mbps per second). The size of general purpose processors therefore reduces the area of a memory tag that can be given over to memory and/or requires more power than can be provided to run the entire tag in order to carry out computations.

Accordingly, there is a need for a memory tag in which the area of the tag dedicated to memory is maximised, in which data can be processed at a sufficiently high rate and/or in which power consumption during processing is minimised. There is also a need for a processor, suitable for use in a memory tag, which has a minimal footprint, which can process data at a sufficiently high rate and/or which exhibits a minimal power consumption.

US 2003/0039247 discloses a method and apparatus for general purpose packet reception processing.

As stated above, memory tags are generally implemented using an array of non-volatile memory, for example flash memory.

Flash memory has a number of advantages. In particular, no power supply is required to preserve the contents of the flash memory. This means that flash memory is particularly suited for use in memory tags where there is no on-board power supply.

In general, flash memory comprises an array of memory cells. Data is written serially into the memory cells along the columns and rows of the array. The structure of the array is such that the process of writing data serially to the flash memory is convoluted and different amounts of time are required to write the data into the cells depending on where the data is being written relative to the internal boundaries of the memory cells.

The following are characteristics of all types of flash memory:—

(i) the write time is relatively long compared to other types of memory because a certain amount of time is required to program each memory cell at a particular address row and columns;

(ii) the write time required when writing across a page boundary is generally longer than the time required to write within the page;

(iii) single words cannot be erased within the flash memory, only whole pages can be erased and this page erase process takes a long time relative to the write process;

(iv) after a relatively low number of page erases have taken place (approximately 1000 erases), a page becomes physically damaged and unusable.

Conventional systems for writing to flash memory generally comprise a volatile memory buffer which stores data being written to the flash memory before the data is actually written. The buffer allows the integrity of data to be checked before it is written to the flash memory.

If there was no buffer and data was written directly into the flash memory and then its integrity checked and an error detected, a entire page would have to be erased and rewritten (following retransmission of a data packet).

As discussed above, it desirable to reduce the size of memory tags. The smaller a memory tag is, the more versatile it is. In addition, there is a need to reduce power consumption in the memory tag. Memory buffers are large relative to the size of the memory tag and consume additional power. Therefore, it is advantageous to avoid using memory buffers in memory tags to store incoming data before it is written.

Incoming data therefore has to be written into the memory as soon as it arrives. However, in conventional data transmission formats, the checksum for verifying the integrity of the data arrives at the end of the data payload. It is therefore not possible to check the data integrity before it is written.

Accordingly, there is a need for an apparatus and method for writing data into a memory tag which ensures that received data can be error checked before it is written into the flash memory of the memory tag.

SUMMARY OF THE INVENTION

This invention seeks to address the above mentioned deficiencies by providing a processor for use as the central processing unit of a memory tag, the processor having a minimal footprint in Silicon or other suitable material from which the memory in the tag may be manufactured. The present invention therefore provides a processor, comprising a plurality of registers configured to receive in parallel data that are input to the processor, and to process in parallel the received data, and a micro sequencer and instruction decoder module adapted to select two or more of the plurality of registers to receive the data that are input to the processor, and to control the processing of the received data by the two or more selected registers.

A memory device comprising an array of non-volatile memory, means for receiving data from and transmitting data to a host, and a processor according to the invention is also provided.

A method of processing, in a processor, incoming data comprising receiving incoming data in parallel at two or more of a plurality of registers configured to receive and process data in parallel, the two or more registers being selected from the plurality of registers by a micro sequencer and instruction decoder module, and processing the received data using the selected registers under the control of the micro sequencer and instruction decoder is also provided.

This invention also seeks to address the above mentioned deficiencies by providing, in an alternative embodiment of the invention, a processor for writing data contained in payload data of a data packet to memory, comprising a first register adapted to latch first data corresponding to a segment of the payload data, and a second register adapted to receive second data from the payload data to enable the validity of the data latched into the first register to be established before data is written to memory.

A memory device, comprising an array of non-volatile memory, a data transfer channel and the processor according to the alternative embodiment of the invention is also provided.

A method of processing, in a processor, a data packet, comprising: (a) receiving first data in the processor corresponding to a segment of payload data in the data packet, (b) receiving second data in the processor from the payload data, (c) processing the second data to enable the validity of the first data to be established, and (d) if the first data is valid, outputting the first data to enable the first data to be written to memory is also provided.

A packet for the transmission of data to a processor, comprising a data payload including a plurality of data segments, each data segment followed by a check field corresponding to its preceding data segment is also provided.

A method of writing data into a non-volatile memory, comprising receiving a first segment of the data into a data register, receiving a second segment of the data into the data register after an interval of time after receiving the first segment, and writing the first segment into the memory and clearing the data register to receive the second segment in the interval of time between receiving the first segment and receiving the second segment is also provided. A memory tag for receiving data, comprising a data register configured to receive a first segment of the data and a second segment of the data after an interval of time after receiving the first segment of the data, and an array of non-volatile memory for receiving the first segment of the data from the data register in the interval of time, wherein the data register is cleared in the interval of time after the non-volatile memory has received the first segment of the data is also provided.

Apparatus is also provided for writing data to a non-volatile memory comprising: a transceiver adapted to transmit data to a memory tag in which the non-volatile memory resides and receive configuration data on the non-volatile memory; and a processor connected to the transceiver configured to format the data to be written into the non-volatile memory in accordance with the configuration data.

A method of writing data into non-volatile memory, comprising: obtaining configuration data on the non-volatile memory; and formatting the data to be written into the non-volatile memory by inserting padding data between segments of the data, wherein the length of padding data inserted between each data segment is selected in accordance with the configuration data is also provided.

BRIEF DESCRIPTION OF THE DRAWINGS

Specific embodiments of the present invention are now described, by way of example only, with reference to the accompanying drawings in which:

FIG. 6 is flow diagram depicting the manner in which incoming packet header information is processed by the processor of the invention;

DETAILED DESCRIPTION

Figure 2:
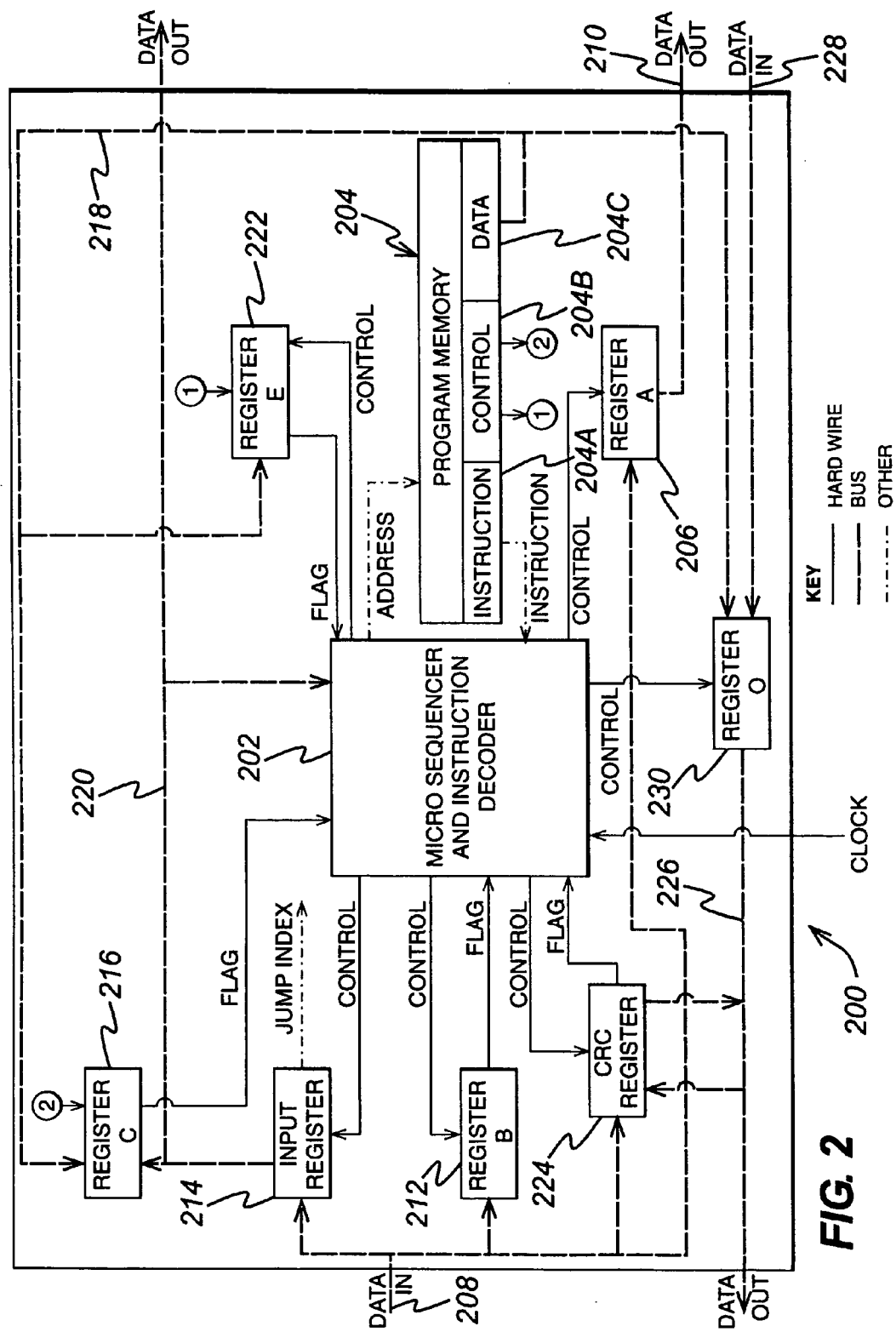
FIG. 2 is a schematic of a processor according to one embodiment of the invention.

The present invention, as will now be described firstly with reference to FIG. 2, is a processor for controlling the operation of a memory tag. However, as will be readily appreciated by the skilled reader, the processor of the invention is not limited to use as the central processor for a memory tag, and may readily be applied in other applications, especially those where low power consumption and/or a small footprint are desirable.

FIG. 2 is a schematic representation of a processor 200 according to one embodiment of the invention. The heart of the processor 200 is a micro sequencer and instruction decoder 202, which is described in more detail below. As will be made clear in the following examples, the micro sequencer and instruction decoder 202 controls the operation of the processor by delivering control signals to all other blocks in the processor 200 based upon instructions which are provided to and decoded by it. These control signals are determined by the current instruction in an instruction field 204a within the program memory 204. The processor of the invention is event or data driven. That is, the action taken by the processor is determined by the data that it receives. Until certain conditions are met, the processor will remain idle, therefore minimising power consumption. Processing only occurs when data that satisfies the criteria set by the instructions within the program memory 204 are received, thereby causing processing to be carried out by the processor 200.

A number of data registers are provided, and are hard-wired to the micro sequencer and instruction decoder 202. Each of these registers has a unique function in addition to its ability to latch in and out data that is provided to it. These registers are as follows. Register A 206 is hard-wired to the micro sequencer and instruction decoder 200 to receive, from the micro sequencer and instruction decoder 202 two types of control signal. Both control signals are shown in FIG. 2 by a single arrow connecting the appropriate modules. This depiction is adopted for all other modules in FIG. 2. The first control signal is a register enable signal, and the second is a signal instructing register A 206 to increment the value stored in it by one. Hence, register A can be configured to begin counting from its current value, when instructed to do so by the micro sequencer and instruction decoder 202. Register A is also connected to a data bus 208 such that, when it is enabled, it latches in the data present upon the data bus 208. As will become apparent, register A is employed to latch address data, for example. Finally, Register A is connected to an output data bus 210 such that it is able to output the data latched into it for example to the memory which the processor controls.

Register B 212 is hard-wired to the micro sequencer and instruction decoder 202, again to receive two types of control signal. The first of these control signals is a register enable signal which activates the register to latch data, from the data input bus 208 which is also connected to register B 212, into the register 212. The second control signal is operative to cause register B to decrement by one the value which has been latched into it. The register B 212 is also hard-wired to flag the micro sequencer and instruction decoder 202 when the value stored in that register has been decremented such that it reaches zero. The flag signal is depicted in FIG. 2 as a single arrow connecting the appropriate modules. Again this depiction is adopted throughout FIG. 2. In a preferred embodiment, the flag is high (i.e. 1) when zero is reached and is low (i.e. 0) at all other times. The micro sequencer and instruction decoder 202 thus looks at the flag value, and if it is high knows that register B 212 has a value of zero stored within it. Register B, as will be seen below, is employed to latch in data representative of a length of data associated with an instruction in one embodiment of the invention.

Input register 214 is connected to the data input bus 208, and is hard-wired to micro sequencer and instruction decoder 202 to receive a register enable signal. When the input register 214 is enabled, the data present on the data input bus is latched into the input register 214. As will become clear below, the input register is employed to receive first header data and also synchronisation data. The input register 214 is also operative to output a jump index signal. This is discussed in more detail below.

Register C 216 is hard-wired to the micro sequencer and instruction decoder 202 to receive a load signal. The load signal is provided from a control region 204 of the program memory 204. The load signal causes register C 216 to load into it a bit pattern specified within the program memory 204 data region 204c. The loading of this bit pattern is caused by the instructions present in instruction region 204a of program memory 204 specifying the load instruction for execution. The specific pattern of bits is stored in the data region 204c of program memory 204. Data is transmitted from the data region 204c of the program memory 204 to register C 216 via an internal data bus 218. The input register 214 and register C216 are also connected via an output data bus 220.

The combination of the input register 214 and register C 216 forms a monitoring module, in one embodiment of the invention, which monitors data received at the processor. It is operative to compare the bit pattern loaded into register C 216 with a bit pattern that is latched into the input register 214 from the input data bus 208. When the bit pattern stored in register C 216 and in the input register are the same, register C flags the micro sequencer and instruction decoder 202 to this effect. It is hard-wired to do this. In a preferred embodiment, register C 216 flags the micro sequencer and instruction decoder 202 with a high value (i.e. 1) when the value in register C is the same as the value in input register 214, and flags the micro sequencer and instruction decoder 202 with a low value (i.e. 0) at all other times.

Register E 222 is hard-wired to the micro sequencer and instruction decoder 202 also. This register is operative in one embodiment to delay the processor whilst data is received or transmitted as will become clear. It receives from the micro sequencer and instruction decoder 202 two control signals. The first of these is an enable signal which, when supplied to register E 222, causes register E to latch in the data presented on the internal data bus 218, which is connected to register E 222. The second control signal that may be provided to register E 222 is a decrement signal. This control signal causes register E to decrement the value latched into it by one. Register E is hard-wired to the micro sequencer and instruction decoder 202 to pass a flag to it when the stored value reaches zero. In effect, register E is a counter. A value is loaded into register E via the internal data bus 218 and is decremented by one upon receipt of a control signal from the control region 204b of program memory 204. When the value in register E reaches zero, a flag sent to the micro sequencer and instruction decoder 202.

CRC register 224 is hard-wired to the micro sequencer and instruction decoder 202 to receive two types of control signal and to return a flag to the micro sequencer and instruction decoder. The first control signal is an enable signal which enables the CRC register 224 both to latch into it data presented on the data input bus 208 which is connected to the CRC register 224 and to commence a cyclic redundancy check on the data that is received in order to verify that the data received is that which was sent. The flag that is returned to the micro sequencer and instruction decoder 202 indicates whether the cyclic redundancy check that has been carried out, when completed, indicates that the data received has been received correctly. Cyclic redundancy checking is well known in the art and is therefore not discussed in any detail here. In a preferred embodiment, the flag returned by the CRC register 224 is high (i.e. 1) when cyclic redundancy checking indicates that data has been received correctly, and is low (i.e. 0 at all other times).

The cyclic redundancy check register 224 is also connected to receive further data input and to provide further data output to a second output data bus 226. Data that is intended to be received by the cyclic redundancy check register 224 from the data bus 226 is provided by an input data bus 228 via register O 230. The data input bus 228 busses data into the processor 200, for example from a memory associated with and controlled by the processor 200, to register O 230. Data output bus 226 busses the data latched into register O 230 from there to the CRC register 224 and also out of the processor 200, for example to a host device that submitted a read request. Register O 230 is connected also to the internal data bus 218 in order that it may receive a data value from the data region 204c of the program memory, and is hard-wired to the micro sequencer and instruction decoder 202 to receive two control signals. The first of these control signals is an enable signal and the second is a load signal which, when supplied to register O 230 causes the data provided to it to be latched in.

The second control signal provided to the CRC register 224 triggers it to begin generating checksum data from the data passed to it on bus 226. This data is appended to the data transmitted from the processor 200, via register O 230, in order that the receiving device can assess the validity of the data that it receives.

As will be appreciated from FIG. 2, a number of registers are configured to receive data from the input bus 208. These are registers A 206 and B 212, the input register 214 and the CRC register 224. As will be made clear below, combinations of these registers are enabled to receive data from the data input bus 208, by the microsequencer and instruction decoder module 202, in parallel. Examples are the CRC register in combination with any of Registers A or B or the input register. These combinations of registers are also controlled, by the micro sequencer and instruction decoder 202 to process the data received in parallel. Preferably, the processing of the data in the chosen combinations of registers is carried out simultaneously, and more preferably independently. Each of the registers operates on received date in the ways specified below. The provision of these functions in the registers removes the need for an Arithmetic Logic Unit, and thus reduces the footprint and power requirements of the processor.

The micro sequencer and instruction decoder 202 receives a clock signal. The clock signal is necessary to cause the processor to clock data in and out and to carry out the necessary operations in a cyclic fashion. As will be apparent, the clock signal is received from an external source, and is not generated within the processor 200. In a preferred embodiment, in which the processor is utilised in a memory tag, the clock signal is synchronised with that of the memory tag reader device via the inductive link between the reader and tag when the reader is brought into sufficiently close proximity to power up and interact with the memory tag.

The program memory 204 interacts with the micro sequencer and instruction decoder 202 as follows. Address information is received from the micro sequencer and instruction decoder 202 by the program memory. This address information is received as data input and is used in performing accesses to the program memory 204. The program memory also provides, to the micro sequencer and instruction decoder 202, the instructions which enable the micro sequencer and instruction decoder to control the processor. This is achieved via the passage of instructions from instruction region 204a of program memory 204 to the micro sequencer and instruction decoder 202 in accordance with the requirements of the control program loaded into the program memory 204.

Figure 3:
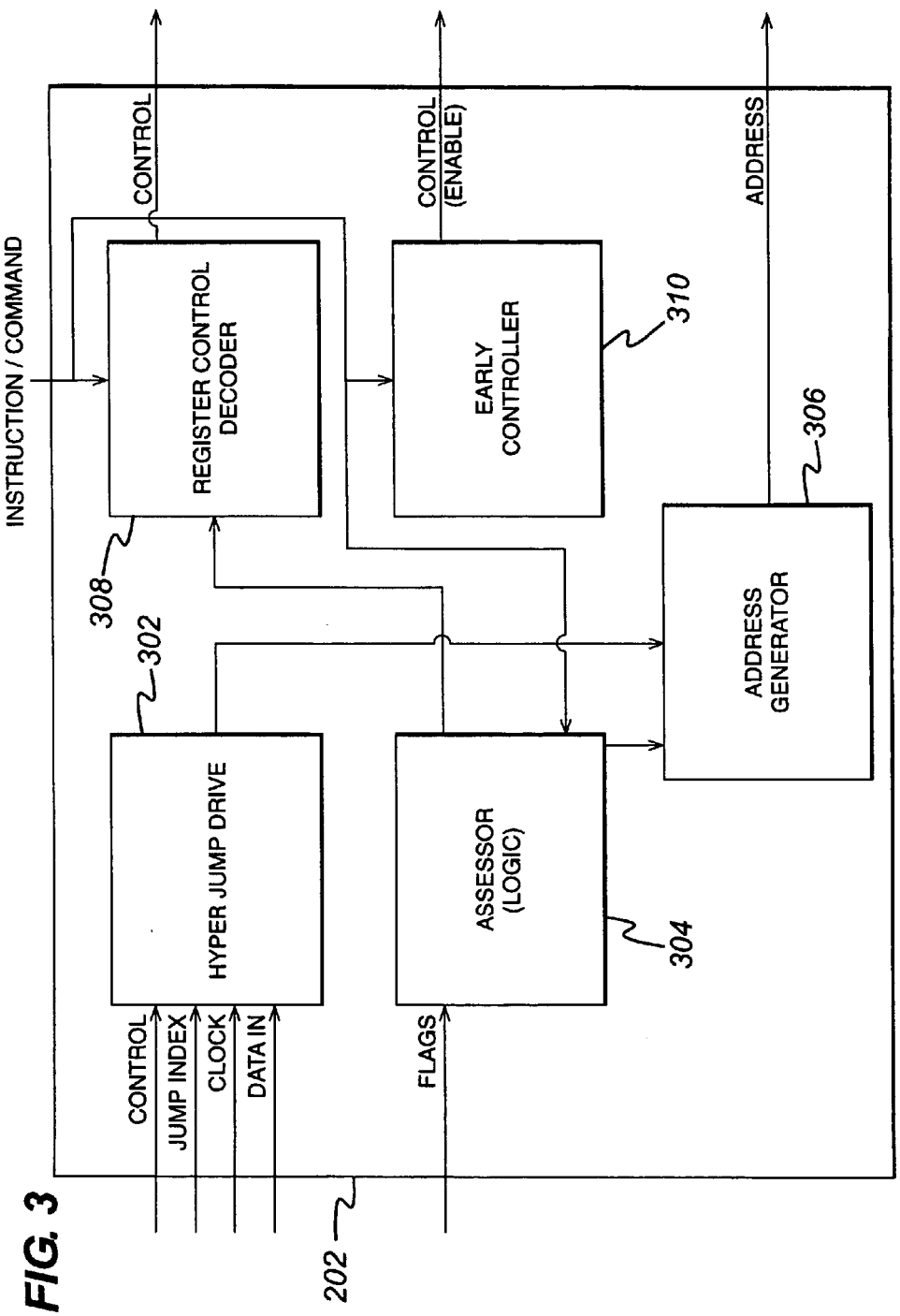
FIG. 3 is a schematic of the micro sequencer and instruction decoder of FIG. 2.

The micro sequencer and instruction decoder 202 will now be described in more detail with reference to FIG. 3. The micro sequencer is a programmable state machine. That is, it generates the next state or action that is to be entered or carried out based upon the current state of the micro sequencer and instruction decoder 202 and the current input or inputs to it. As is shown in FIG. 3, the micro sequencer and instruction decoder 202 comprises five main functional blocks. These are the hyper jump drive 302, the assessor 304, the address generator 306, the register control decoder 308 and the early controller 310. The micro sequencer and instruction decoder 202 generates the next state or instruction for the processor 200 as a whole based upon the value of a command presented to it and the result of the assessor 304.

The assessor 304 receives, as its input, all of the flags provided to the micro sequencer and instruction decoder 202. It is controlled in accordance with a command or instruction that is imported to the micro sequencer and instruction decoder 202 via the internal data bus 220. The assessor 304 is basically a logic device. It generates and outputs the logical AND function of some or all of the flag signals that are provided to it and also generates and outputs the logical OR function of some or all of the flag signals returned to it. The combination of flags that are utilised in the logical AND and/or OR functions is determined by the instruction being processed. The output of the assesser 304 is provided to the register control decoder 308.

The assessor 304 includes a number of elements that are not shown in FIG. 3. These comprise logic modules to receive the inputs and perform the functions mentioned above, and logic to receive instructions as to which inputs are to be used in the function mentioned above and thus to control the logic performing the functions. In the preferred embodiment there are two logic combinations. A first logic combination performs the logical AND function on the data inputs in accordance with a result mask instruction (which is described below) passed to the assessor 304. The result of this function is passed to the register control decoder 308 and to the address generator 306. A second logic combination performs the logical OR function on the data input in accordance with a proceed mask instruction (which is described below) passed to the assessor 304. The result of this function is passed to the address generator 306.

The address generator 306 receives input from the hyper jump drive 302 and the assessor 304. The address generator comprises logic that takes from the hyper jump drive an address associated with a required routine (i.e. loaded into a jump vector), from the internal data bus 220, to which it is also connected, an address to which the micro sequencer and instruction decoder 202 is instructed to move, and an instruction to move to the next instruction in the sequence of instructions defined in region 204a of the program memory 204. Only one of these signals is received at any one time. From these, a pointer to the required instruction is generated and loaded into an instruction pointer register (not shown). The instruction pointer register also receives the clock signal and the output of the assessor 304. When the assessor flags this register, which it does when the logical OR function produces the desired logical flag (i.e. on the clock cycle when the flag is at the correct value) the instruction pointed to by the pointer is moved to by the micro sequencer and instruction decoder 202.

The register control decoder 308 receives as its input the load field (described below) of the instruction that is being processed in addition to the above specified output of the assessor 304. The register control decoder 308, utilising these inputs, issues control signals to load the registers which may be loaded. These include jump vector registers within the hyper jump drive 302 as described below.

The early controller 310 operates in the same fashion as the register control decoder 308 with the exception that it outputs its control signals on the falling edge of the clock cycle as opposed to the leading edge of the next clock cycle for the register decoder. The enable field (described below) of the current instruction is provided to the early control module 310 and, based upon this, the early control module enables, as required, the appropriate registers to carry out the required routines. Hence, the registers that are to be controlled by the register control decoder 308 are first enabled by the early controller 310.

The hyper jump drive 302 has, as its input, the input data bus 208, the clock signal, the jump index signal and the control signals to initialise a number of jump vectors (provided by the register control decoder 308). The hyper jump drive 202 contains a look up table in which is stored each of the commands that the processor expects to receive and then carry out. For example, the look up table may include a jump vector field storing an address in the program memory at which a read routine is located, a jump vector field at which is stored an address at which a write routine is located and a jump vector field which stores an address at which a jump fail routine (e.g. a negative acknowledgement (NACK routine)) is located. The hyper jump drive serves to compare a command that is received over the data input bus 208, via input register 214, with the commands stored in the various jump vector fields and, when a command matches one of the stored commands, causes the operation of the processor to branch or jump to the address at which the required routine is stored in the program memory 204. The appropriate jump command is provided from the hyper jump drive 302 to the address generator 306. When the required conditions are judged to be met by the assessor 304 (i.e. the logical OR routine returns the appropriate flag as dictated by the proceed mask), the address provided to the address generator 306 is triggered and output via the assessor 304. The address is then used to cause the processor to jump to the instructions stored in the program memory at the specified address, and thus the routine embodied in those instructions to be carried out. The address generator is also able to generate further addresses, including incrementing a current address by one for example.

It is to be noted that the hyper jump drive 302 selects which redirection vector or jump vector is to be utilised based upon the value of the jump index which it receives from the input register 214. In other words, the jump index value is pipelined directly from the input register 214 to the hyper jump drive 302, thus enabling the next state to be generated as soon as the command is received in the processor. This contributes to the high speed at which this processor operates.

The processor of this invention is a programmable processor. The instruction set in the program memory 204 defines its operation and may be changed such that the processor operates as is required. Moreover, the number of instructions/jump vectors that are loaded in the lookup table and thus which are recognised by the hyper jump drive may be altered to enable many more functions than simple read and write operations to be carried out. This will become clearer later. As will be evident, the processor described above minimises its footprint, for example the amount of silicon that it utilises in a silicon based device, in a number of ways. Firstly, the processor does not utilise buffers of any significant size. Buffers inherently occupy considerable space in silicon and the absence reduces the footprint of the processor 200. Moreover, it will be noted that there is no arithmetic logic unit present in the processor 200. High processing rates are achieved by optimising and limiting the instruction set, provided in the instruction region 204a of the program memory 204, such that it deals only with data processing. A result is that, as the processor is specific to data processing, it requires a minimal number of instructions to perform a task allotted to it. A low core clock rate is therefore required in comparison with the core clock rate required by a traditional processor, such as that described with reference to FIG. 1, to carry out the same task in the same amount of time. This is because fewer operations are required in the processor 200 than would be required in a general purpose processor.

The processor of this invention is configured such that it requires a single cycle of the core clock only to carry out each instruction. Often, only a single cycle is required to carry out each task. In order to achieve this, the processor core is synchronised with the data which it processes. All instructions that are carried out by the processor are designed to operate within one clock cycle. Each instruction that is to be carried out by the processor is fetched, decoded, executed and the results are evaluated on the same cycle. Hence pipelining is unnecessary. As the processor core is synchronised with the data which it processes, instructions are carried out conditional on the circumstances expected by the processor being met. That is, the processor waits for a certain set of circumstances to occur and then carries out the appropriate instructions. Whilst it is waiting, the processor is idle and therefore has minimal power consumption.

In a preferred embodiment, the following instruction format is utilised in the micro sequencer and instruction decoder 202. These instructions are stored in the instruction field 204a in the program memory 204. Each instruction contains six fields. These are described separately below.

The first field, which in a preferred embodiment is two bits long, specifies the type of jump that is required to be carried out by the specific instruction. Four types of jumps are available. These are as follows.
1. Repeat current instruction until signalled otherwise by the assessor module 304, then move to the next instruction or the value specified in the jump fail vector.
2. Repeat the current instruction until signalled otherwise by the assessor module 304, then perform a jump in accordance with the instructions in one of the jump vectors.
3. Move to the next instruction.
4. Move to the location specified in the data field of the instruction.

The next field in the instruction is the result mask field. In a preferred embodiment, the result mask field is four bits long. The purpose of this field is to specify which of the flag values passed to the assessor 304 are to be included in the logical AND operation function performed in the assessor module 304. The signals that may be included are the flags passed back from register B 212, register C 216, the CRC register 224 and register E 222. Table 1 below shows the values that may be present in the result mask field and the resulting logical operations that are carried out in the assessor module 304. The result passed from the asssesor 304 is thus the result of the specified function. A flag is passed when the assessor generates a logical high.

TABLE 1

| Result Mask Value | Logical Operation on Regsiter Flags |
|---|---|
| 0 0 0 1 | E |
| 0 0 1 0 | CRC |
| 0 0 1 1 | CRC AND E |
| 0 1 0 0 | C |
| 0 1 0 1 | C AND E |
| 0 1 1 0 | C AND CRC |
| 0 1 1 1 | C AND CRC AND E |
| 1 0 0 0 | B |
| 1 0 0 1 | B AND E |
| 1 0 1 0 | B AND CRC |
| 1 0 1 1 | B AND CRC AND E |
| 1 1 0 0 | B AND C |
| 1 1 0 1 | B AND C AND E |
| 1 1 1 0 | B AND C AND CRC |
| 1 1 1 1 | B AND C AND CRC AND E |

The third field in the instruction is the proceed mask field. This field specifies which register flags are to be included in the logical OR function that is carried out in the assessor module 304. The possible proceed mask field signals, which in a preferred embodiment are three bits long, and the resulting logical combination of flag signals is shown in Table 2 below. The assessor 304 flags the instruction pointer in the address generator 306 when the specified function yields a logical high. As will be appreciated, certain conditions may therefore be included in instructions, which must be met to enable that instruction's execution. That is, it may be specified (via the proceed value) in an instruction which flags must have been returned to the micro sequencer and instruction decoder module, or must be true, to enable the processor to proceed with a current instruction. If the proceed value is not met, the processor will not proceed.

TABLE 2

| Proceed Mask Value | Logical Operation on Register Flags |
|---|---|
| 0 0 1 | E |
| 0 1 0 | C |
| 0 1 1 | C OR E |
| 1 0 0 | B |
| 1 0 1 | B OR E |
| 1 1 0 | B OR C |
| 1 1 1 | B OR C OR E |

The next field in the instruction is the register enable field. In a preferred embodiment, this field is 18 bits long. This field specifies which register should be enabled by the early controller 310. Enablement may depend also upon the logical AND function carried out in the assessor module 304. The field may specify four separate conditions. These are as follows:
1. The specified register is enabled.
2. The specified register is disabled.
3. The specified register is enabled if the result of the logical AND operation carried out in the assessor block 304 is logical high. If it is logical low, the register is disabled.
4. The specified register is enabled if the result of the logical AND operation carried out in the assessor module 304 is logical low. If it is logical high, the register is disabled.

In the preferred embodiment, this field is 18 bits long.

The next field in the instruction is the load field. This field is, in the preferred embodiment 4 bits in length. This field carries instructions for the register control decoder 308 to load the register specified in the field with the data in the data field of the instruction.

The final field in the instruction is the data field. In the preferred embodiment, the data field is 8 bits long. The data field includes data for loading into the registers specified in the load field.

In order to demonstrate the operation of the processor of the invention, two examples will now be presented. The first example is of a request to read data stored in non-volatile memory (which is being controlled by the processor of the invention) from the memory, via the processor, to a host. The second example is of the transmission of data from the host to the memory via the processor of the invention. As will be apparent from the following discussions, and from FIGS. 5 and 6, a number of the steps in the two examples are common. Hence, these are described once only.

Figure 4:
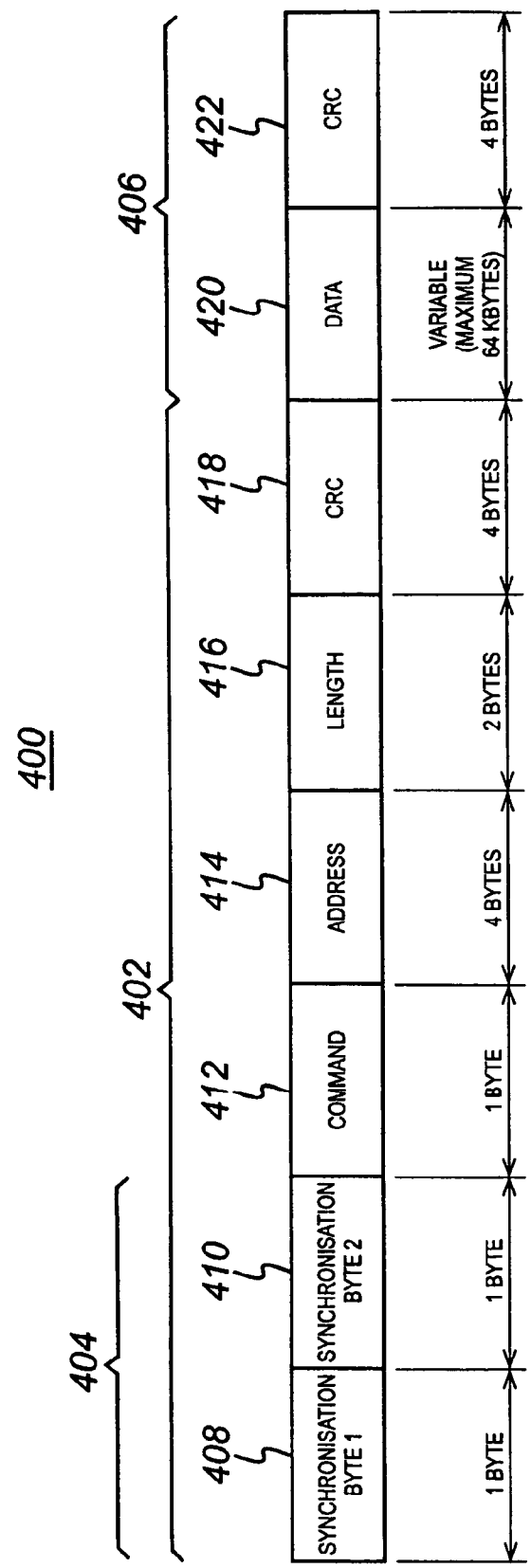
FIG. 4 is a representation of a data packet structure utilised in the embodiment of the invention shown in FIG. 2.

As the processor of the invention does not employ buffers, it must deal with each bit of data that it receives prior to the receipt of the next bit. One application in which this processor 200 may be used is in the control of memory tags. Data is transferred to memory tags at speeds of up to 10 Mbps per second. This means that the processor has only 800 nanoseconds to process a byte of data that it receives. In view of this limitation, a data structure must be chosen to enable the transfer of data to and from the processor. Moreover, as the processor is data or event driven, data must be delivered in such a fashion that the processor 200 recognises it and the core of the processor 200 can be synchronised to it. An example data structure which may be used with the process of this invention is shown in FIG. 4. However, other data structures may be used with the processor of the invention, and the invention is therefore not limited to the specific structure shown.

FIG. 4 shows the format of a data packet 400 according to the embodiment of the invention shown in FIG. 2. The packet 400 may be viewed as having two distinct sections. The first section of the packet is the header section 402. This includes a distinct sub section that is referred to hereinafter as the framing section 404. The second distinct section of the data packet is the payload 406, which may or may not be present depending on the operation associated with the header section 402.

The framing sub-section 404 of the data packet includes two discrete synchronisation fields or bytes. The framing sub-section 404 is a unique sequence of bits that mark the beginning of a valid packet of data. As will be described in more detail below, the processor 200 looks continuously for receipt of the framing sub-section 404 of the data packet 400 and, once this is received, the processor 200 starts processing the data stream that it receives as if it were a valid packet of data. In a preferred embodiment, each synchronisation field is one byte long and is identical, i.e. it includes an identical bit pattern. Of course, the framing sub section is not limited to the presence of two synchronisation bytes 408, 410 as shown. Three or more may be employed. Moreover, the framing fields or bytes used need not be identical. In order to deal with different synchronisation fields register C 216 need only be programmed with the appropriate values. The processor 200 may also be modified to encompass additional combinations of input register 214 and register 216 for more complicated synchronisation fields.

After the two synchronisation fields which form the framing sub-section 404, the next field in the header is the command field 412. The command field 412 is, in the preferred embodiment one byte long. The command field includes a value which tells the processor what the packet is for. For example, the command field may include a pattern of bits that, when compared with the recognised instructions in the look up table of the hyper jump drive 302, indicates to the processor that the packet is a write packet (i.e. it defines a transfer of data to the processor and thus the memory associated with it). Equally, the command field value may indicate a read request. It will be understood that in the preferred embodiment, the command field 412 is one byte long. Accordingly, this field may have loaded into it 256 different commands (i.e. $2^8$). Quite clearly, the read command and the write command take up only two of the possible 256 available bit patterns and thus command possibilities. The processor of the invention, utilising the packet data structure depicted in FIG. 4 may therefore be instructed to process, and may process, many more functions than merely read and write.

The next field in the header 402 is the address field 414. The address field is four bytes long in the preferred embodiment and sets forth the source or destination in the memory which is being controlled by the processor 200 at which data in a payload section 406 of the packet is to be written, or from which data is to be read. The field in the header 402 following the address field 414 is the length field 416. The length field 416 is two bytes in length in the preferred embodiment, and comprises an indication of the number of bytes of data that are present in the data field 420 of the payload section 406 of the packet 400 in a write packet or the amount of data to be read in a read packet.

The final field in the header section 402 of the packet 400 is a cyclic redundancy check field. This field is four bytes long in the preferred embodiment and includes the checksum (calculated using cyclic redundancy checking) associated with the header 402. The data in this field is used to carry out a cyclic redundancy check, in the processor 200, to ensure that the received header is a valid representation of the header transmitted to the processor by a host.

The payload section 406 of the packet 400 consists of two fields only. The first field is the data field 420. The data field is variable in size and can be up to 64 Kbytes long in the preferred embodiment. It includes the data that is to be transferred to the memory (in a write operation) that is controlled by the processor 200. The length of the data field is indicated by the length field 416 of the header 402. The data field 420 is followed by a further cyclic redundancy check field 422, which again is 4 bytes long in the preferred embodiment. This CRC field includes the checksum data for the preceding data field 420 and operates in the same way as the CRC field 418.

Figure 12:
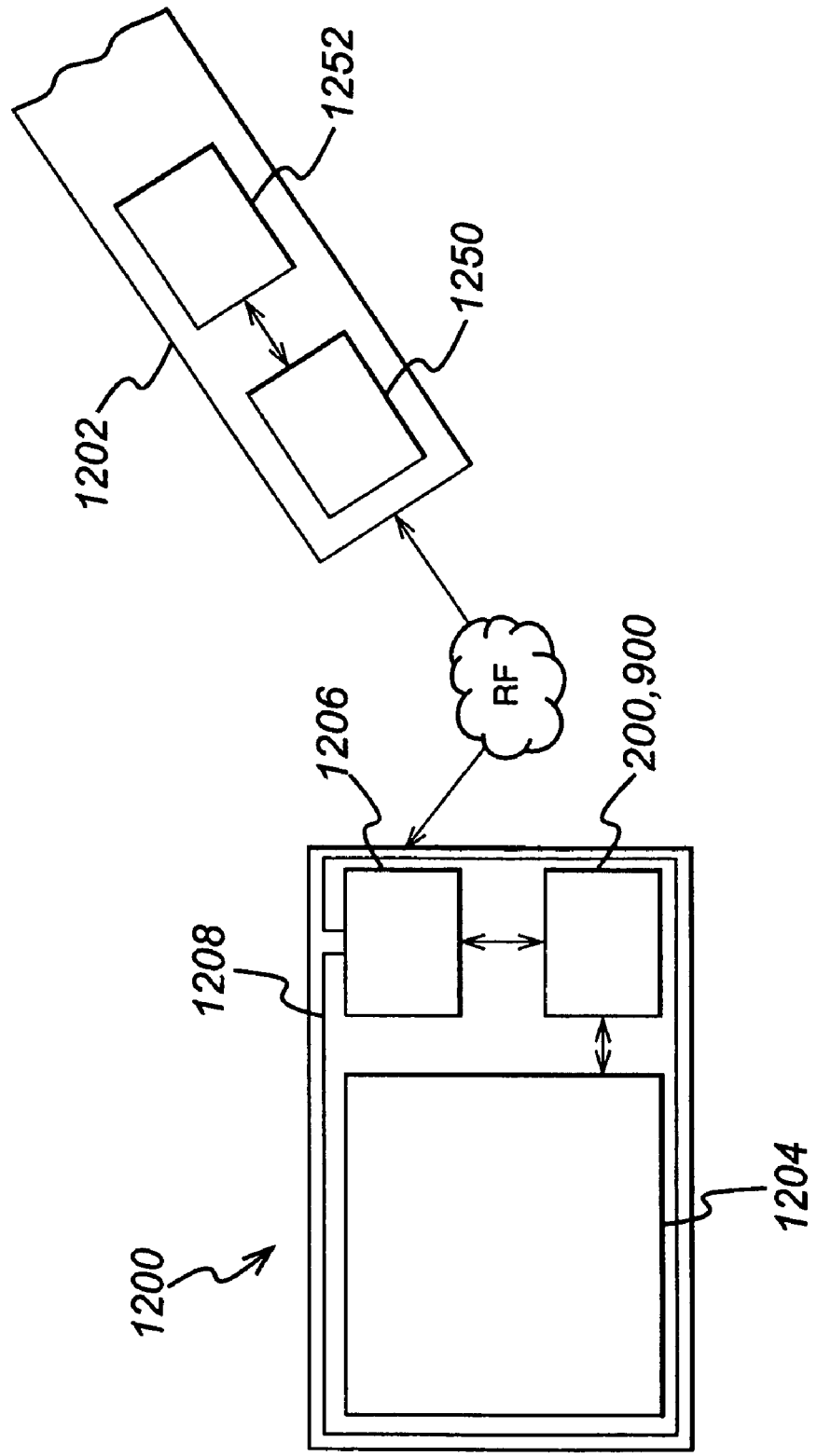
FIG. 12 illustrates a memory tag incorporating the processor of the present invention in communication with a memory tag reading/writing device.

The operation of the processor 200 of the present invention in exemplary read and write scenarios is now explained with reference to FIGS. 5 to 8. The following discussion is based upon the presence of the processor in a memory device consisting of non-volatile memory, access to which is controlled by the processor 200 of the invention. This may take the form of a memory tag which is inductively coupled to a reader device as discussed earlier. Such a memory tag is depicted in FIG. 12. However, the processor may be located in any form of memory device.

Figure 5:
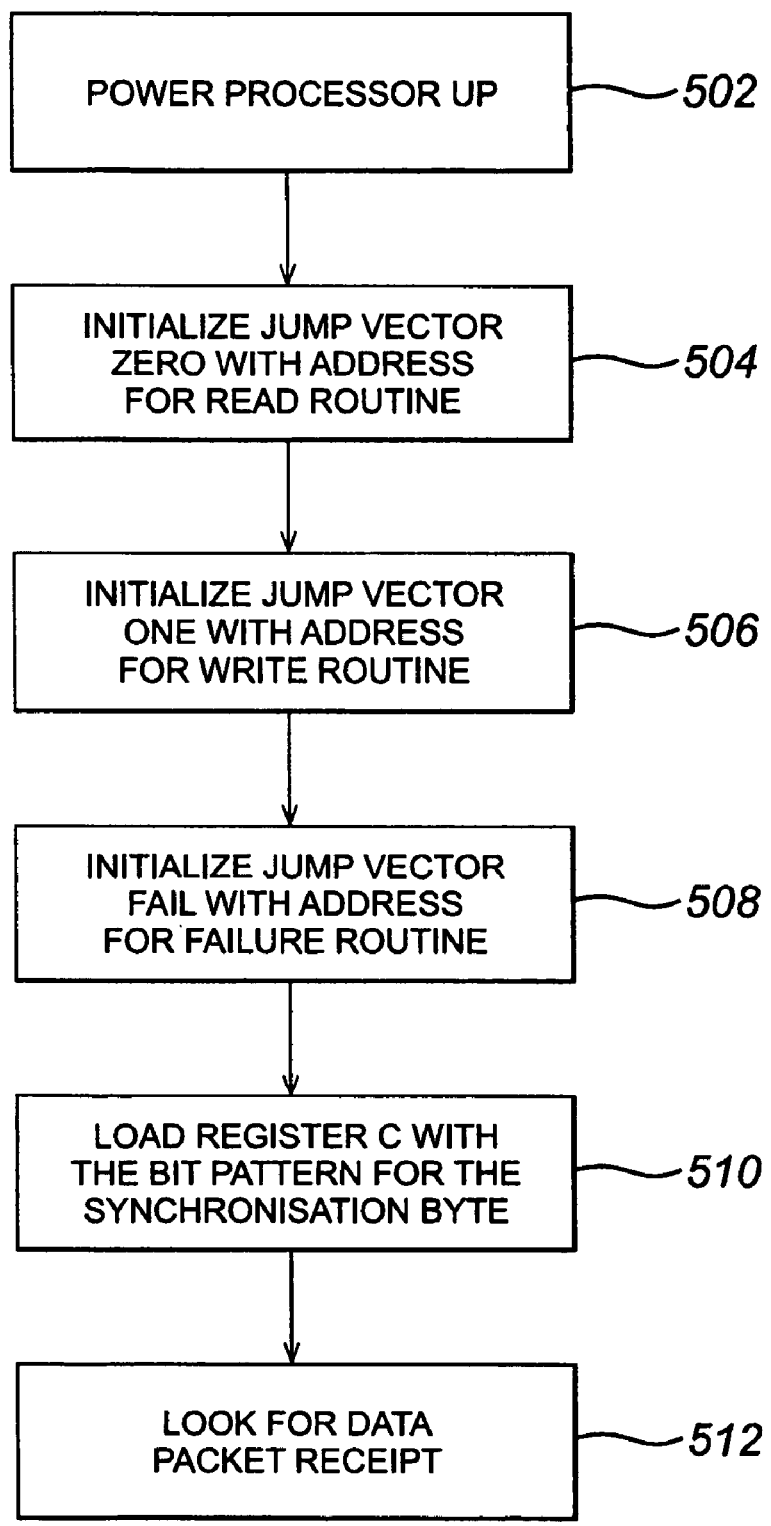
FIG. 5 is a flow diagram showing the initialisation procedure for the processor according to the invention.

FIG. 5 sets forth the power up and initialisation procedure for the processor 200 of the invention. In the example of a memory tag, such as memory tag 900 in FIG. 12, which is powered up by a interrogator 1202 brought into close proximity therewith (via inductive coupling) this procedure is carried out every time the interrogator causes the memory tag to power up. Firstly, a interrogator 1202 is brought into close proximity with the memory tag 900 and, using inductive coupling, supplies power to the memory tag. Upon receipt of power from the interrogator 1202, the processor 200 powers up (function box 502) and begins the initialisation procedure set forth in the instruction region 204a of the program memory 204. Firstly, a first jump vector, jump vector zero, located in the hyper jump drive 302 of the micro sequencer and instruction decoder 202 is loaded with the address, in the program memory 204, at which a read routine is stored (function box 504). Secondly, in the same fashion, a second jump vector, jump vector one, is loaded with the address in the program memory 204 at which a write routine is located (function box 506). Thirdly, a further jump vector, jump vector fail, is loaded with the address at which a failure routine is located in the program memory 204 (function box 508). These jump vectors form the lookup table in the hyper jump drive 302.

Once the jump vectors have been initialised, register C 216 is loaded with the bit pattern for the synchronisation bytes that form the framing sub-section 404 of the header 402 of the packet 400 shown in FIG. 4. This step is shown in function box 510. The instruction executed by the micro sequencer and instruction decoder 202 causes the transfer of the bit pattern from the data region 204c of the program memory 204 via the bus 218 in accordance with the control signal (register C) issued by the control region 204b of the program memory 204. Once this step has been performed, the processor has completed its initialisation and is ready to await receipt of data, in the form of data packet 400 in the preferred embodiment. The processor is idle until such time as a first synchronisation byte is received. Hence, whilst the processor is looking for the receipt of a data packet (function box 512) very little or no power is consumed, because processing only occurs upon receipt of data.

The instructions that are executed in the processor to enable the processor to hunt for the receipt of the first framing byte 408 of the data packet 400 are as follows. Firstly, the assessor 304 is instructed to require only the receipt of the flag signal from register C in order to proceed. That is, the proceed mask value provided to the assessor is set with the logical signal "010". Input register 214 is enabled via the micro sequencer and instruction decoder 202 such that data bits that are received on the data bus 208 are latched into it serially one bit at a time. It sets the result flag in the assessor 304 to have a value of 1, and stalls the processor.

The manner in which the processor of the invention identifies and processes a data packet, such as data packet 400, will now be described with reference to FIG. 6. The processor 200 is currently in a stalled state. It is hunting for receipt of a first synchronisation byte, such as synchronisation byte 408. Every incoming byte of data is latched, bitwise, into input register 214. Register C 216 already has stored in it the bit pattern for the synchronisation byte that it is expected to receive at the processor 200. Register C 216 is configured to perform a comparison between the bit pattern stored in it and each byte of data latched into the input register as discussed above.

Data is transferred from the input register 214 to register C 216 across the bus 220 and when the byte of data in the input register 214 matches the byte of data in register C216. Register C sends a flag to the micro sequencer and instruction decoder 202. Referring specifically to FIG. 6, the processor is initially in the hunt state in which every input byte is compared with the synchronisation byte stored in register C 216 (function box 602). The combination of the input register 214 and register C 216 forms comparison circuitry which looks at every byte that is input to the input register and determines whether a match has occurred (function box 604). If a match has not occurred, the processor remains in the hunt state (function box 602). However, when a match does occur, the processor knows that a first synchronisation byte has been received. The processor then moves on to the next instruction in region 204a of the program memory 204.

The processor 200 now sets a proceed mask value in the assessor 304, using the logic signal "011", so that the assessor 304 will cause the processor to proceed if either a flag from register C 214 or a flag from register E 222 is received. It enables the input register 214 to receive incoming data and sets the result mask value in the assessor using the logical signal "0110", to be logical high only when register C 216 and register E 222 both return flags to the micro sequencer and instruction decoder 202.

The processor detects receipt of a second synchronisation byte, such as byte 410 in FIG. 4, as follows. Firstly, register E 222 is loaded with a first count value $N_1$ and is controlled to decrement this value by 1 on each subsequent clock cycle of the processor (function box 606). It is determined (function box 608) on each clock cycle whether $N_1$ has been decremented to equal zero (a flag is returned by register E 222 if it has). If it has not, the process continues. However, if it has, register E flags the micro sequencer and instruction decoder 202 as already mentioned. At the same time, the next input byte (i.e. byte $a_{r+1}$ where the first synchronisation byte is byte at) is latched into the input register 214 in a bitwise fashion. Again, the combination of the input register 214 and register C 216 carries out a comparison (function box 610) between the bit pattern stored in register C 216 and the byte read into the input register 214. If a match has not occurred (function box 612) the processor returns to the hunt state (function 602). However, if a match has occurred, register C 216 sends a flag indicating such to the micro sequencer and instruction decoder 202.

As was stated above, the assessor 204 has been set to proceed when either register C 216 or register E 222 returns a flag. In function box 614, when either of these two registers returns a flag, it is determined, in the assessor 306, whether a flag has been returned from both registers. If it has not, the microsequencer and instruction decoder 202 executes an instruction which causes the process to jump to the address specified in the jump fail vector within the hyper jump drive 302. The jump fail vector is initially set to cause the processor to return to the hunt state. Hence, as shown in FIG. 6, when the result of function box 614 is negative, the process returns to the hunt state depicted by function box 602. However, if both registers C and E 216, 222 have returned an appropriate flag, the processor knows that a second synchronisation byte has been received. So, function box 614 determines, whether a valid data packet is being received or not.

In a preferred embodiment of the present invention, the value $N_1$ is set as 6 clock cycles. This is because a second synchronisation byte would be expected to have been received within 6 clock cycles from receipt of the first synchronisation byte.

The processor 200 now knows that a valid data packet is to be received. Hence, the jump vector, jump vector fail, is reloaded with the address in the program memory 204 at which a routine to transmit a negative acknowledgement (NACK) back to the interrogator may be found. NACK routines are well known to those skilled in the art of packetised data transmission and are therefore not discussed further here. This step is carried out in function box 616.

The next instruction carried out by the micro sequencer and instruction decoder 202 is to load a second value, $N_2$, into register E 222 (function box 618). In the preferred embodiment, the value of $N_2$ is five cycles, because it is expected that the next field in the data packet, field 412 in FIG. 4, which represents the command field, would have been received within this time period. However, other values will be appropriate to other implementations of the invention. Register E 222 is controlled to decrement its value by one on every subsequent clock cycle. Hence, the control decoder and micro sequencer 202 waits until the value of $N_2$ has been decremented to equal zero. The value for the proceed logic will be "001". Until such time, the command field 412 of the data packet 400 is read into the input register 214. This data is also provided, as a jump index, directly to the hyper jump drive 302. The jump index enables the hyper jump drive 302 to determine where to branch to next within the program in program memory 204.

When the second count N2 has been decremented to reach zero, (function box 620), a flag is returned by register E 222 and the micro sequencer and instruction decoder 202, by means of hyper jump drive 302, compares the received command with the jump vectors that were loaded into the hyper jump drive (function box 622). These jump vectors were input to the look up table previously. The value stored in the command field 412 will, in this example, represent either a read command or a write command. Hence, in function box 624 it is determined whether the received command is a read command. If it is, the processor jumps to the read routine at the address loaded into jump vector zero (function 626). At the same time, it is determined whether the command is a write command (function box 628). If it is, the processor jumps to the write routine at the address stored in jump vector one (function box 630).

As will be appreciated, the procedure set forth in FIGS. 5 and 6 is common to all operations carried out by the processor of this invention. Any instruction packet received by the processor will be dealt with in the same way. Read and write routines will now be described separately with reference to FIGS. 7 and 8 respectively.

Figure 7:
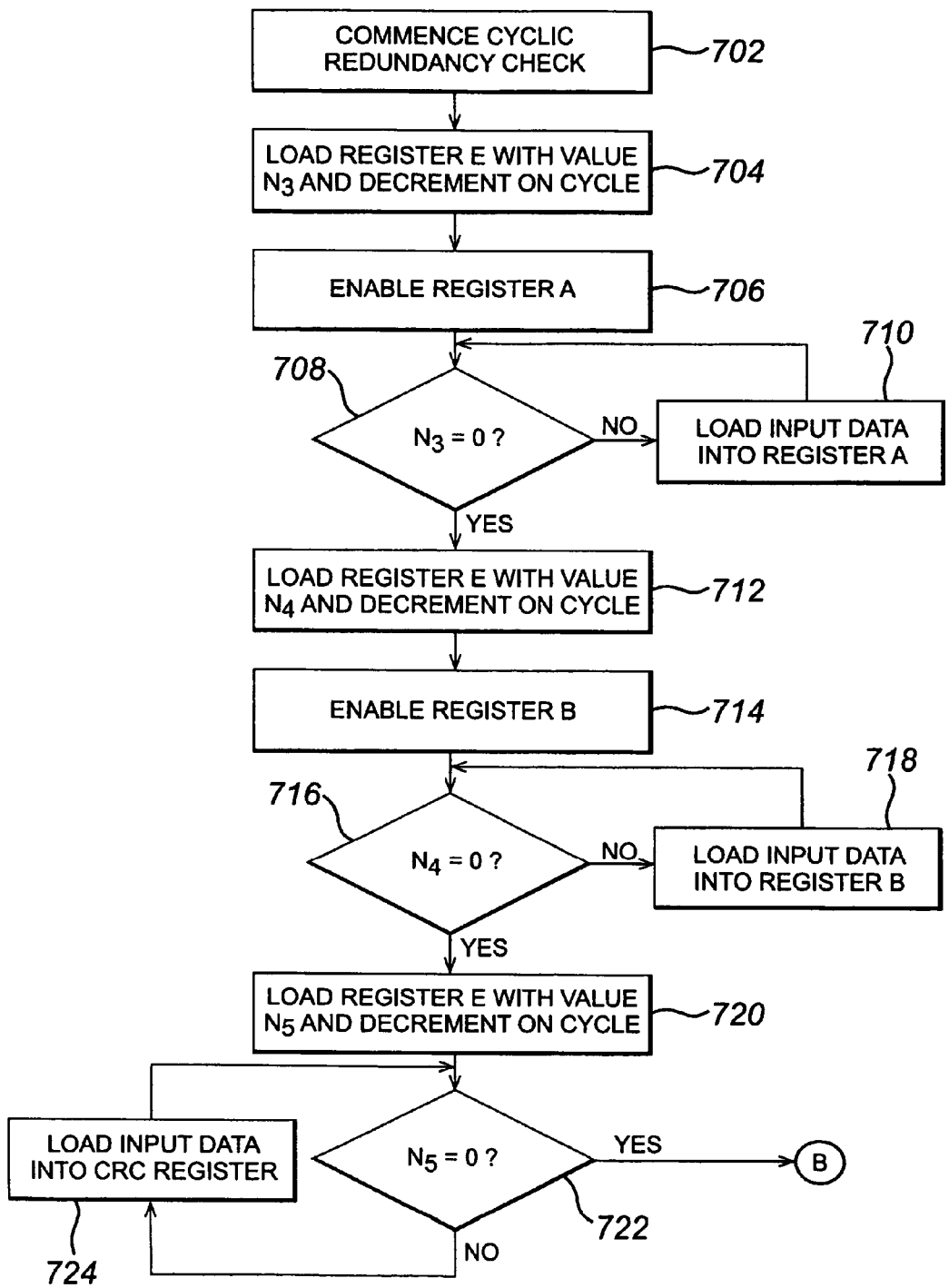
FIG. 7 is a flow diagram depicting the implementation of a memory tag read request utilising the process of the present invention.

The first instructions that are executed in the read routine are set forth in function boxes 702 and 704 in FIG. 7. These are to commence cyclic redundancy checking 702 and to load a third count value, $N_3$, into register E 222. The cyclic redundancy check register 224 is enabled and receives the data that is being input on data bus 208 in order that it can carry out cyclic redundancy checking on that data. The data is latched into the cyclic redundancy check register 224 in a bitwise fashion. Register E 222 is also controlled to decrement the value loaded into it by one on each subsequent clock cycle of the processor 200.

The next step is to enable register A 206 (function box 706). This is achieved by an enable signal being provided to register A by the micro sequencer and instruction decoder 202 in accordance with the instruction being executed.

As shown in function boxes 708 and 710 whilst the count value $N_3$ is not equal to zero, the processor does not move forward (it remains in the same state). However, it does load the input data received via the input bus 208 on each clock cycle into register A 206. Once $N_3$ has been decremented to be equal to zero register E 222 returns a flag to the processor 200, which then knows that the entire address field, field 414 of data packet 400, has been loaded into register A 206. The proceed value in this case will be "001". In a preferred embodiment, $N_3$ is set to 30 clock cycles, because it is expected that the entire address field will have been latched into register A 206 when 30 cycles have transpired. The micro sequencer and instruction decoder 202 then moves on to the next instruction in the read routine.

The next step mirrors, essentially, the steps set forth in function boxes 704 to 710. The micro sequencer 202 loads a count value, $N_4$, into register E 222 and controls register E 222 to decrement that value by one for each subsequent clock cycle (function box 712). Next, the micro sequencer and instruction decoder 202 enables register B 212 which is then operative to latch in the data on bus 208 (function box 714). The proceed value is set to "001". In function boxes 716 and 718, as each cycle of the processor transpires, if the count value exceeds zero (function box 716) the next instruction is not executed and the data on the data bus 208 is latched into register B 212 (function box 718). In a preferred embodiment, the count value N4 is chosen to be 16, because it is expected that the length field 416 of data packet 400 will have been received after this number of clock cycles. When the count N4 does equal zero, register B 212 flags the micro sequencer and instruction decoder 202 as described above with reference to FIG. 2.

At this point in the procedure, the processor 200 (by virtue of the micro sequencer and instruction decoder 202) knows that it has received the address and length fields of the data packet 400. However, it is still necessary to ensure that what has been received is correct. As stated earlier, the cyclic redundancy check register 224 was initiated at the beginning of the read routine. This receives all of the data transmitted into the processor on bus 208 since it was enabled. However, as will be appreciated from the data packet structure 400, in order that cyclic redundancy checking can be completed, it is necessary also for the processor to read in and process the cyclic redundancy check field 418 (containing the checksum) of the data packet which relates to header information.

Hence, register E 222 is loaded with a fifth count value, $N_5$, by the micro sequencer and instruction decoder 202. Register E 222 is also controlled to decrement the value stored on it on each subsequent cycle (function box 720). Whilst the count exceeds zero, the data that is being input into the processor is latched into the CRC register 224, which continues to carry out cyclic redundancy checking on that data by latching in and processing the CRC field 418. This is shown in function boxes 722 and 724. The proceed value is set to "001" and the result value to "0011". Once count $N_5$ has been decremented to equal zero, register E 222 flags the micro sequencer and instruction decoder 202 as described above. The micro sequencer and instruction decoder 202 knows that the first CRC field 418 in data packet 400 has been fully received and that the CRC register 224 has completed cyclic redundancy checking on the received data. In the preferred embodiment, $N_5$ is set to 30 clock cycles. 30 clock cycles is sufficient, in the preferred embodiment, for the CRC field to be read into the processor and for the cyclic redundancy check to be completed by CRC register 224.

Once the cyclic redundancy check has been completed, the micro sequencer and instruction decoder 202 checks the flag that is returned to it by the CRC register 224. In a preferred embodiment, a logical low flag is returned if cyclic redundancy checking indicates that the header has been received correctly. Otherwise a logical high flag is returned. Hence, in function box 726 the micro sequencer and instruction decoder 202 determines whether the CRC register 224 has indicated that the header information received is correct or not. Since the result mask is set to "0011" the assessor will look at the values of the CRC and E registers. Both have to be true before the result is true. If it is not, the process is caused by the read routine instructions to move into the hyper jump unit where jump vector fail is adopted as the next instruction. This causes the routine to branch to the address at which a NACK routine is stored. A NACK routine is executed sending a NACK message back to the device which sent the packet to the processor. This message is then dealt with in that device or host in the normal way. For example, the packet may be re-sent, or an error message may be displayed to a user thereof. The action taken in the event of the CRC register 224 returning a flag indicating that the header has not been correctly received is presented in function box 728.

If the CRC check indicates that the header 402 has been received correctly, the next instruction in the read routine is executed by the micro sequencer and instruction decoder 202. That is, CRC register 224 is enabled and begins generating CRC information to be applied to the data that is to be read out from the memory device associated with and controlled by the processor 200 (function box 730).

Next, data is read from the memory associated with the processor 200 and sent on to the host. In order that this may be done, the micro sequencer and instruction decoder 202 enables register O 230 and controls it to load data from the memory, at the address specified in register A 206. The data at the specified address is latched into register O 230 on bus 208 and is bussed out on bus 226. It is noted that the data that is being bussed out on bus 226 is also provided to the CRC register 224 such that the CRC register may begin generating the checksum information required to validate the transmitted data. This step is depicted in function box 732.

Register B 212 already has loaded into it the length of/an amount of data that is requested be read from the memory associated with processor 200. In order to read out the required amount of data, the micro sequencer and instruction decoder 202 enters a loop. Once the data at the memory location defined by the address in register A 206 has been latched into register O 230, the address in register A 206 is incremented (function box 734) such that register A 206 holds the next sequential address in the memory. Next, the length value, stored in register B 212 is decremented by one. Whilst the length value in register B212 is greater than zero, (function box 738) the process loops back to function box 732 and reads out the data at the next memory location. When the length value in register B is decremented such that it equals zero, a flag is returned to the micro sequencer and instruction decoder 202 as discussed above. The proceed value is "100". The processor then knows that the data that has been transmitted, via register O and buses 228 and 226, is equal to the amount of data that was requested to be transmitted in the read request packet.

In order that the host, in the example being used here the memory tag interrogator 1202, can check that data transmitted to it is valid, a cyclic redundancy check field is attached to the end of the data that is read from the memory. As already noted, the CRC register 224 has been generating checksum information based upon the data being transmitted. However, it needs to complete its calculation in order that the checksum information can be generated. Hence, register E 222 is loaded with a count value $N_6$, and is controlled to decrement this value on each subsequent cycle (as shown in function box 740). The proceed value is set to "001". The micro sequencer and instruction decoder 202 determines when $N_6$ has reached zero (register E sends a flag indicating this to the micro sequencer and instruction decoder 202) and then the CRC register 224 is deactivated (function boxes 742 and 744). In the preferred embodiment, the sixth count value is set as 30 clock cycles because the preferred CRC register 224 will have completed its computation within this period of time.

The checksum information generated by CRC register 224 is then flushed from that register. As the data in the CRC register 224 contains 4 bytes of data, it will take a number of clock cycles to flush the data out. Hence, the micro sequencer and instruction decoder 202 sets a seventh count value, $N_7$, in register E 222 and controls register E 222 to decrement that value on each subsequent cycle (function box 746). On each clock cycle, one bit of data is flushed from the CRC register 224. Hence, the processor enters a loop. The proceed value is "001" Once the seventh count value has been decremented such that it equals zero, a flag is returned by register E 222 so that the micro sequencer and instruction decoder knows and the next instruction in the program memory 204 is executed.

The next instruction causes the processor 200 to jump to a defined re-start position within the program. In the preferred embodiment the re-start location is defined by function box 508. Here the jump vector fail address is reloaded such that, upon failure (see function box 614) the micro sequencer and instruction decoder 202 causes the process to return to function box 602 (the hunt state), rather than jumping to the NACK routine.

As will be appreciated from FIG. 2, the program memory 204 controls directly registers E and C. Control signals are delivered from the control region 204b of the program memory 242 to registers C 216 and E 222. These signals are load signals which cause data, bussed from data region 204c of program memory 204 to be loaded into register C (i.e. the bit pattern of the synchronisation byte) and register E (i.e. the various count values). Furthermore, it will be clear that at each point in the procedure wherein the processor enters a loop, e.g. is counting down a value in register E 222 or another register, no further instructions are required to be carried out. The processor is stalled, and thus power consumption is minimised.

The procedure for writing data to a memory that is associated with and controlled by the processor 200 of the embodiment of the invention shown in FIG. 2 will now be described with reference to FIG. 8. Referring briefly to FIG. 6, when the command that is received by the micro sequencer and instruction decoder 202 is a write command, the process jumps to the write routine stored in the program memory 204 (as defined by jump vector one). The first instruction performed by the micro sequencer and instruction decoder 202 is to commence cyclic redundancy checking (function box 802). The micro sequencer and instruction decoder 202 enables the cyclic redundancy check register 224 by passing to it the appropriate control signal in accordance with the instructions stored in the instruction region 204a of program memory 204. The cyclic redundancy check register 224 then latches in the data that is input to the processor on bus 208 in a bitwise fashion and performs cyclic redundancy checking on that data. Register E 222 also has an eighth count value, $N_8$, loaded into it and is controlled to decrement this value by one on each subsequent clock cycle (function box 804).

The next step, function box 806, is to enable register A 206. This is achieved by an enable signal being provided to register A by the micro sequencer and instruction decoder 202 in accordance with the instruction being executed. As shown in function boxes 808 and 810 whilst the count value $N_8$ is not equal to zero the processor 200 does not move forward. However, it does load the input data received via the input bus 208 on each clock cycle into register A 206. Once $N_8$ has been decremented to be equal to zero, register E 222 sends a flag to the micro sequencer and instruction decoder 202 so that the processor 200 knows that the entire address field, field 414 of data packet 400, has been loaded into register A 206. In a preferred embodiment, $N_8$ is set to 30 clock cycles, because it is expected that the entire address field will have been latched into register A 206 when 30 cycles have transpired. The micro sequencer and instruction decoder 202 then moves on to the next instruction in the read routine. In the preferred embodiment, $N_8$ is loaded into Register E and the proceed value is set to "001".

The next step mirrors, essentially, the steps set forth in function boxes 804 to 810. The micro sequencer 202 loads a count value, $N_9$, into register E 222 and controls register E 222 to decrement that value by one for each subsequent clock cycle (function box 812). Next, the micro sequencer and instruction decoder 202 enables register B 212 which is then operative to latch in the data on bus 208 (function box 814). In function boxes 816 and 818, as each cycle of the processor transpires, it is determined whether the count value in the register has been decremented such that it equals zero. The proceed value is set to "001", hence if the count value exceeds zero (function box 816) the next instruction is not executed and the data on the data bus 208 is latched into register B 212 (function box 818). In a preferred embodiment, the count value $N_9$ is chosen to be 16, because it is expected that the length field 416 of data packet 400 will have been received after this number of clock cycles. When the count $N_9$ does equal zero, register B 212 flags the micro sequencer and instruction decoder 202 as described above with reference to FIG. 2. In the preferred embodiment, $N_9$ is loaded into Register E and the proceed value is set to "001".

At this point in the procedure, the processor 200 (by virtue of the micro sequencer and instruction decoder 202) knows that it has received the address and length fields of the data packet 400. However, it is still necessary to ensure that what has been received is correct. As stated earlier, the cyclic redundancy check register 224 was initiated at the beginning of the write routine. This receives all of the data transmitted into the processor on bus 208 since it was enabled. However, as will be appreciated from the data packet structure 400, in order that cyclic redundancy checking can be completed, it is necessary also for the processor to read in and process the cyclic redundancy check field 418 (containing the checksum) of the data packet which relates to header information.

Hence, register E 222 is loaded with a tenth count value, $N_{10}$, by the micro sequencer and instruction decoder 202. Register E 222 is also controlled to decrement the value stored on it on each subsequent cycle (function box 820). Whilst the count exceeds zero, the data that is being input into the processor is latched into the CRC register 224, which continues to carry out cyclic redundancy checking on that data by latching in and processing the CRC field 418. This is shown in function boxes 822 and 824. Once count $N_{10}$ has been decremented to equal zero, register E 222 flags the micro sequencer and instruction decoder 202 as described above. The proceed value is therefore also "001" in this instance. The micro sequencer and instruction decoder 202 knows that the first CRC field 418 in data packet 400 has been fully received and that the CRC register 224 has completed cyclic redundancy checking on the received data. In the preferred embodiment, N10 is set to 30 clock cycles. 30 clock cycles is sufficient, in the preferred embodiment, for the CRC field to be read into the processor and for the cyclic redundancy check to be completed by CRC register 224.

Once the cyclic redundancy check has been completed, the micro sequencer and instruction decoder 202 checks the flag that is returned to it by the CRC register 224. This is indicated to the assessor by setting the result mask to "0011". In a preferred embodiment, a logical low flag is returned if cyclic redundancy checking indicates that the header has been received correctly. Otherwise a logical high flag is returned. Hence, in function box 826 the micro sequencer and instruction decoder 202 determines whether the CRC register 224 has indicated that the header information received is correct or not. If it is not, the process is caused by the read routine instructions to move into the hyper jump unit where jump vector fail is adopted as the next instruction. This causes the routine to branch to the address at which a NACK routine is stored. A NACK routine is executed sending a NACK message back to the device which sent the packet to the processor. This message is then dealt with in that device or host in the normal way. For example, the packet may be re-sent, or an error message may be displayed to a user thereof. The action taken in the event of the CRC register 224 returning a flag indicating that the header has not been correctly received is presented in function box 828.

However, if in function box 826, the CRC register 224 determines that the header portion, for example portion 402 of data packet 400, has been received correctly, the processor 200 begins to transfer received data into the memory associated with and controlled by it. Data is written to the memory as follows. The address at which the write operation is to commence is present in register A 206. Moreover, the length or amount of the data that is to be written is present in register B 212. The micro sequencer and instruction decoder 202, in accordance with instructions received from the instruction region 204a of program memory 204 therefore controls the serial provision (via input register 214 and output data bus 220) of the payload data field, for example field 420 in data packet 400, into the memory, in a bitwise fashion per clock cycle (function box 830). Once the first bit of data has been written into the memory associated with the processor 200, the address stored in register A 206 is incremented by one (in the sequence of addresses within the memory) (function box 832) and the length value in register B 212 is decremented by one (function box 834). This continues until such time as the length value has been decremented to be equal to zero (function box 836). This is indicated to the assessor by setting the proceed value to "100". When the length value reaches zero, register B sends a flag indicative of this to the micro sequencer and instruction decoder 202.

At this point in the process, the processor 200 knows that the number of bytes of data instructed to be written in the received instruction packet 400 have been loaded into the memory. However, more time is required in which to check that the data that has been received is valid data. Accordingly, the micro sequencer and instruction decoder 202 carries out instructions to load an eleventh count value, $N_{11}$, into register E 222 (function box 838) and to control register E 222 to decrement this value by one on each subsequent clock cycle. Once the eleventh count value has been decremented such that it equals zero (function box 840), register E 222 sends a flag indicative of this to the micro sequencer and instruction decoder 202, which then checks the flag value being returned by the CRC register 224 (function box 842). In order to perform the described function, the result mask is set to "0011".

The CRC register operates in the way described in respect of the read routine above. If the flag value returned by the CRC register 224 is logical low for example, the micro sequencer and instruction decoder 202 is instructed to jump to an acknowledgement routine stored in the program memory 204 at an address specified in the instructions (function box 844). Here an acknowledgement message indicating correct receipt of the payload data is transmitted back to the host device, in this example a memory tag interrogator 1202. However, if the flag returned by the CRC register 224 is logical high (in the preferred embodiment), the micro sequencer and instruction decoder 202, via hyper jump drive 302, is instructed to jump to the fail routine at the address loaded previously into the jump vector, jump vector fail, in the hyper jump drive 302. A NACK routine is then carried out as described in respect of the read routine above.

Figure 1:
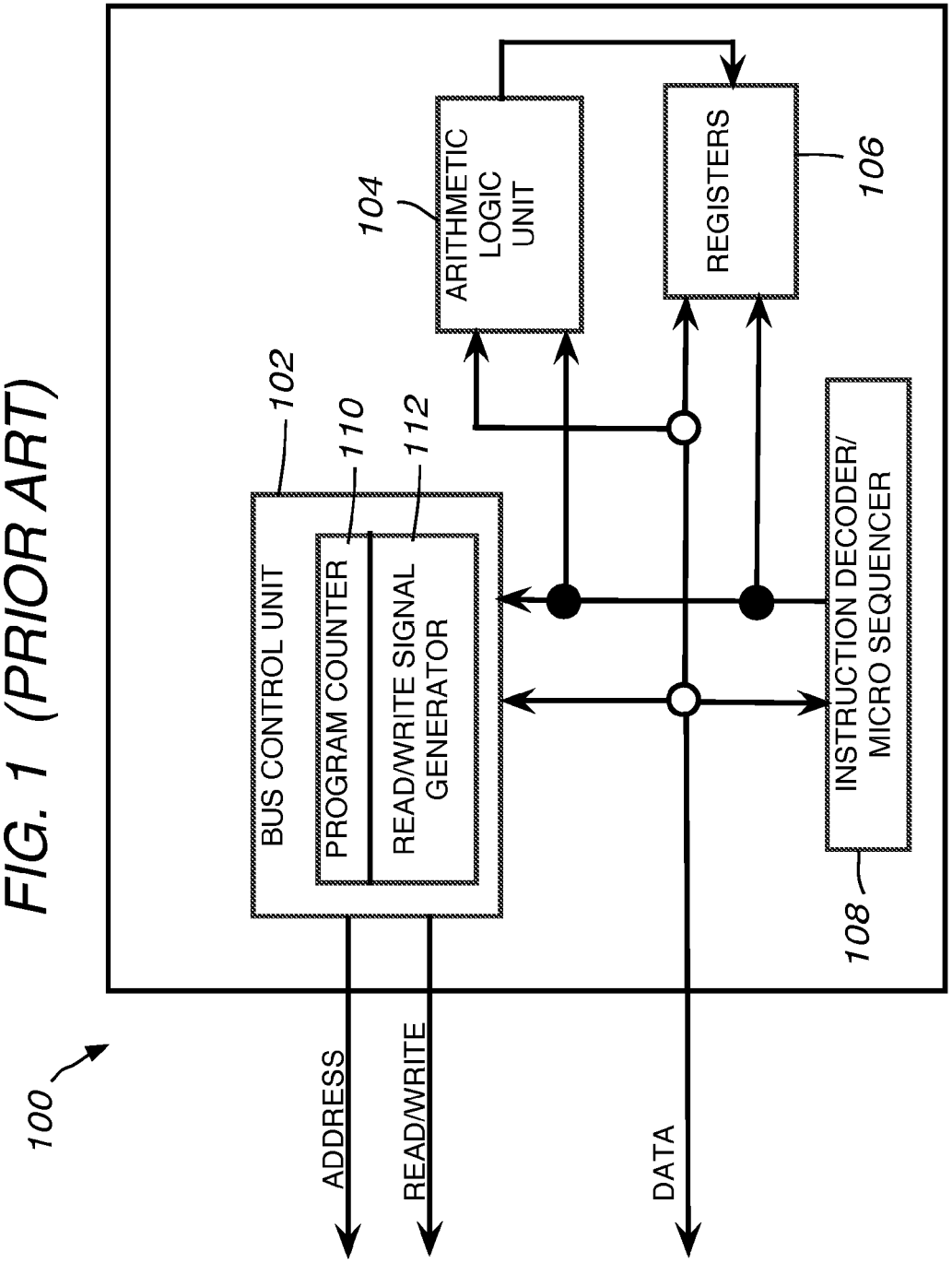
FIG. 1 is a schematic of a prior art microprocessor.

As will be appreciated from the above examples, the processor of the present invention is driven by the data that it receives. Each operation is carried out in a single clock cycle. For example, each bit of data is latched into the appropriate registers, in parallel if necessary (e.g. register B 212 and CRC register 224). Hence, there is no need to buffer the data that is being bussed into the processor. As a result of this, only very simple devices such as the registers described above are utilised in the manufacture of the processor 200 of the present invention. This simplicity ensures a minimum footprint, for example in silicon where the processor is created in a silicon wafer. Moreover the fact that the processor itself is idle for a large amount of time during the processing of either a read or write request demonstrates that the power utilised by the processor is minimised. It is reduced by at least 3 orders of magnitude over that which would be consumed by a general purpose processor such as is shown in FIG. 1. Finally, as has been noted before, the processor of the present invention is a programmable processor. The blocks within the processor can therefore be configured to process a particular segment of incoming data at a time.

Figure 9:
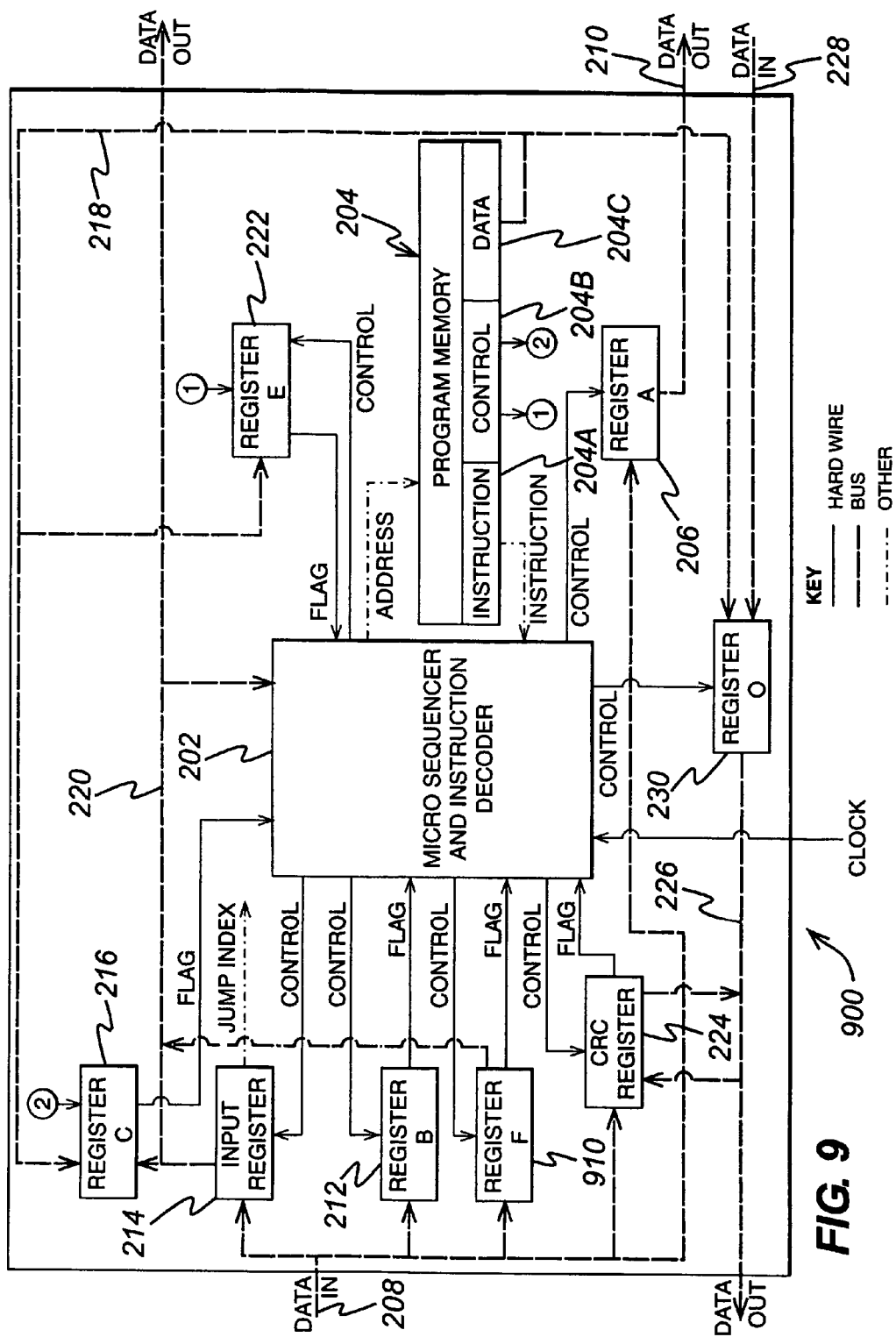
FIG. 9 is a schematic of a processor according to an alternative embodiment of the invention.

FIG. 9 is a schematic representation of a processor 900 according to an alternative embodiment of the invention. The structure of the processor 900 in the embodiment depicted in FIG. 9 is identical to the structure of the embodiment shown in FIG. 2 except that the processor 900 comprises an additional register, register F 910.

Register F 910 is hard-wired to the micro sequencer and instruction decoder 202 to receive a control signal from and to return a flag to the micro sequencer and instruction decoder. The control signal is an enable signal which enables the register F 910 to latch into it data presented on the data input bus 208 which is connected to the register F. The flag that is returned to the micro sequencer and instruction decoder 202 indicates whether data has been latched into register F.

Register F 910 is also connected to provide data output to the output data bus 220 so that data in the register F 910 can be written, for example, to memory connected to the processor.

As will be appreciated from FIG. 9, register F 910 operates as a first register to latch data from the data input bus 208 and output this data to the data output bus 220. As noted above, the input register 214 is also connected to the data input bus 208, and the data output bus 220. Therefore, the input register may serve as the first register to transfer data under the control of the micro sequencer and decoder 202 from the input bus 208 to the data output bus 220.

In this way, there is no need for an additional buffer when the processor 900 is connected to non-volatile memory because incoming data can be output from the processor 900 as soon as it arrives.

As will be explained below, the micro sequencer and decoder 202 are configured in such a way that data received in an alternative format of a flash write data packet 1000 (see FIG. 10 below) can be written directly into the non-volatile memory. Since no additional buffer is required either within the processor 900 or between the processor 900 and the non-volatile memory, the size of a memory tag comprising the processor 900 and non-volatile memory can be reduced. In addition, the power consumption in such a memory tag will be less than when using conventional memory processors.

As stated above in relation to FIG. 2, cyclic redundancy check (CRC) register 224 is hard-wired to the micro sequencer and instruction decoder 202 and operates under the control of the micro sequencer and instruction decoder 202. The CRC register 224 is also connected to receive data input from the data input bus 208. The CRC register 224 functions, in the alternative embodiment of the invention, as a second register. Since the CRC register 224 is connected to the data input bus 208, it can receive a cyclic redundancy check (CRC) field contained in a data packet on the data input bus 208. Each CRC field corresponds to a data segment that will, at the same time, be present in register F 910 and the input register 214. The CRC register 224 is controlled, as described above, to check the validity of the data segment in register F 910 before the data is output on data output bus 220.

In this way, the validity of data received on the data input bus 208 can be determined as soon as the data arrives. If the data is valid, it can be written immediately to non-volatile memory connected to the processor 900. If the data is not valid, the data is not written to the non-volatile memory and, as a result, an entire page of the non-volatile memory does not have to be erased and rewritten.

Figure 10:
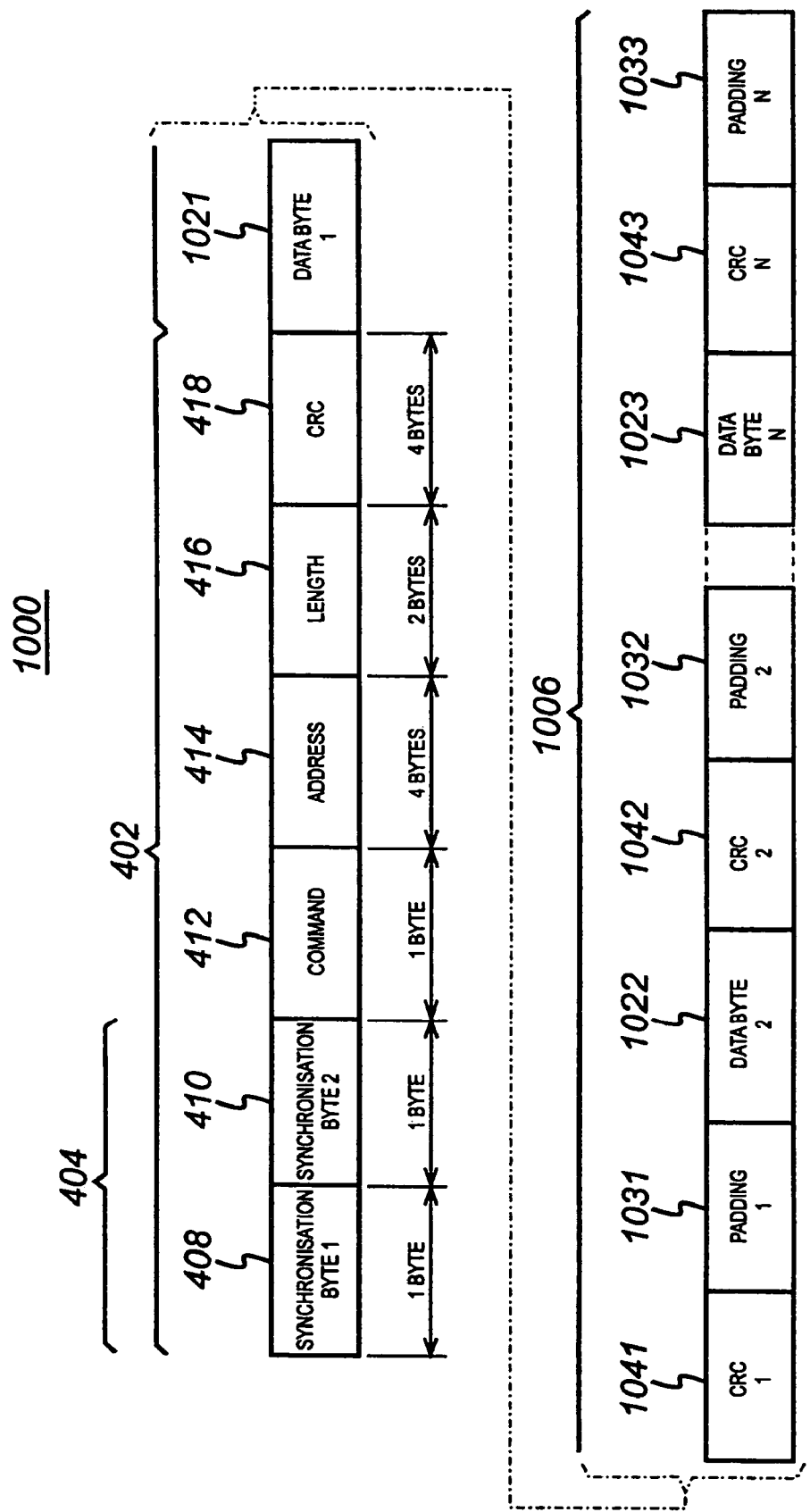
FIG. 10 is a representation of a data packet structure utilised in the embodiment of the invention shown in FIG. 9.

FIG. 10 shows an alternative format of a flash write data packet 1000. As with the packet depicted in FIG. 4, the packet 1000 may be viewed as having two distinct sections. The first section of the data packet 1000 is the header section 402 which is identical to the header section 402 of the packet 400 shown in FIG. 4. As with the packet 400 of FIG. 4, the second distinct section of the data packet is a payload section 1006. The payload section 1006 of FIG. 10 is a different format to the payload section 406 of FIG. 4.

The payload section 1006 of the packet 1000 consists of plurality of data segments 1021, 1022 and 1023. Each data segment 1021, 1022 and 1023 is followed by a corresponding cyclic redundancy check (CRC) field 1041, 1042 and 1043. Each data segment 1021, 1022 and 1023 is one byte in length in the preferred embodiment. The data segments are the data that is to be transferred out of the processor on output data bus 220, for example to memory controlled by the processor 900. Each CRC field 1041, 1042 and 1043 includes the checksum data for its preceding data segment and, in the preferred embodiment is 1 byte in length. In the preferred embodiment, there are 16 data segments in each payload section 1006 and 16 corresponding CRC fields.

The payload section 1006 of the packet 1006 further comprises padding fields 1031, 1032 and 1033 located immediately before each data segment 1021, 1022 and 1023. The function of each padding field is to introduce a delay in the reading of each data segment that follows it. In this way, Each padding field is of a length such that, when processed, the data segment which follows it can be written immediately to memory connected to the processor without having to be temporarily stored. The length of the padding field depends on the requirements of the device to which the processor outputs.

In the preferred embodiment, the processor is connected to flash memory.

The timing requirements of the write cycle of flash memory can mean that it is not possible for the processor 900 to write each data segment 1021, 1022 and 1023 into the memory cells of the flash memory within the clock cycle of the processor 1000. Thus, the padding field ensures that each data segment 1021, 1022 and 1023 is optimally spaced so that data can be written into flash memory as fast as the write cycle of the flash memory supports.

In addition, additional write time is required when data has to be written into a different page of the flash memory. Therefore, when the processor encounters a data segment 1023 that is to be written into a different page (i.e. at a page boundary), additional padding data can be inserted into the padding field 1033 by the device sending the data packet to the processor to ensure that the timing requirements of the flash memory are met. The padding field 1033 is longer than padding fields 1031 and 1032. In the preferred embodiment, the padding fields contain null data.

The operation of the processor 900 in the alternative exemplary write scenario of the present invention is now explained with reference to FIG. 11. The following discussion is based upon the presence of the processor in a memory device consisting of non-volatile memory, access to which is controlled by the processor 900 of the invention. This may take the form of a memory tag which is inductively coupled to a interrogator as discussed earlier. Such a memory tag is depicted in FIG. 12. However, the processor may be located in any form of memory device.

An alternative procedure for writing data to a memory that is associated with and controlled by the processor 900 of the present invention is now described with reference to FIG. 11.

Figure 8:
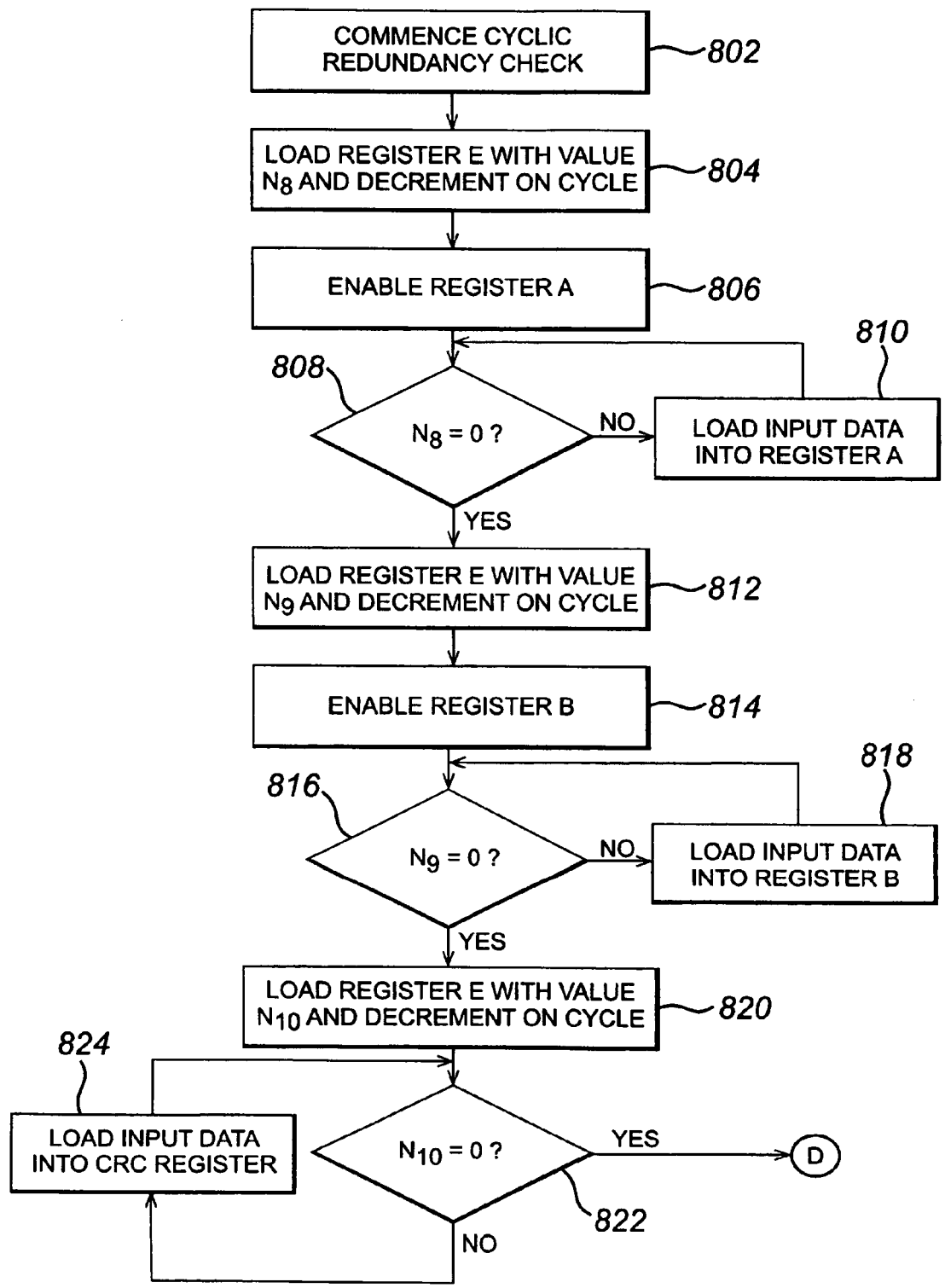
FIG. 8 is a flow diagram depicting the implementation of a write request applied to a memory tag utilising the processor of the embodiment of the invention shown in FIG. 2.
Figure 11:
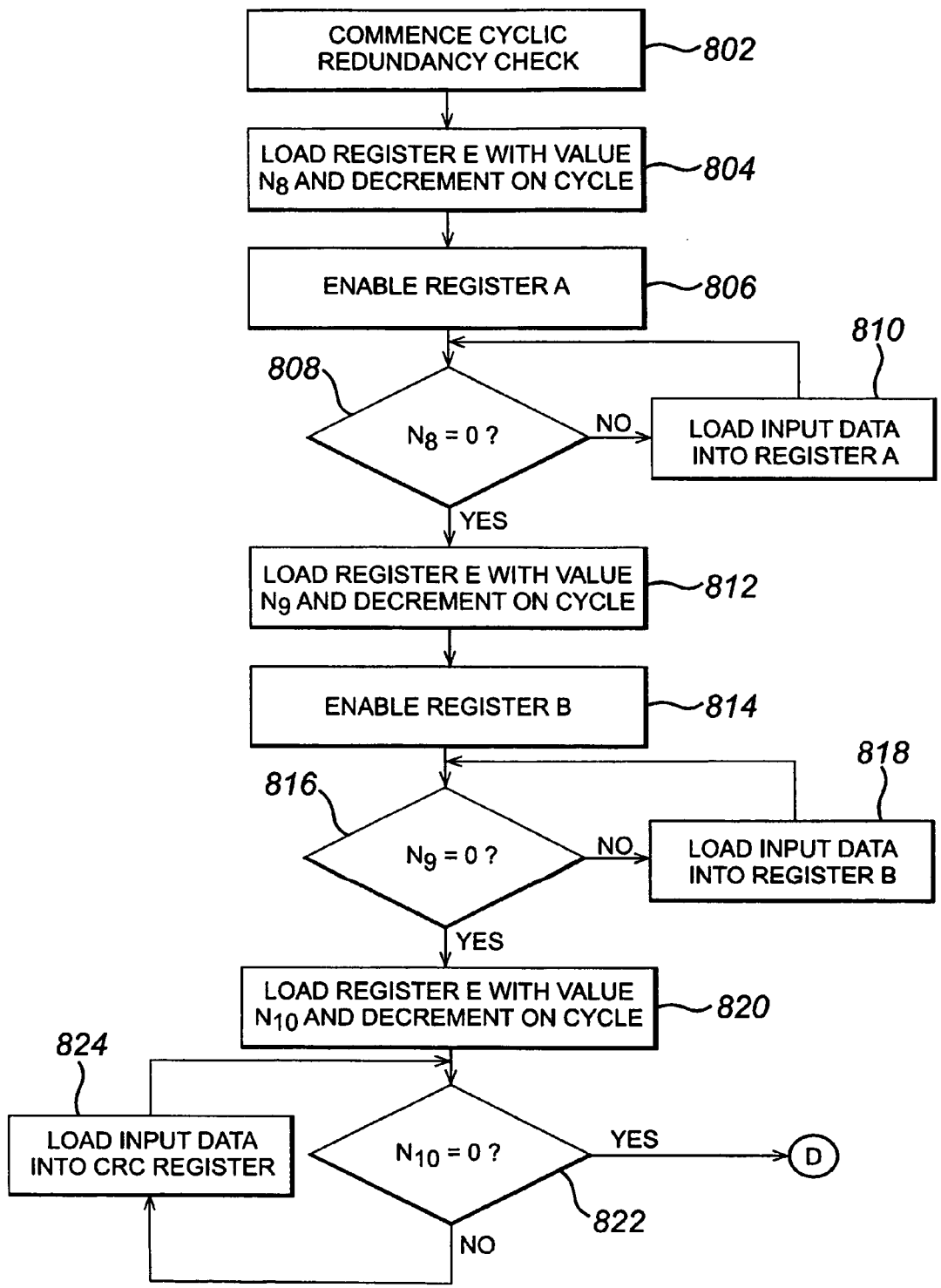
FIG. 11 is a flow diagram depicting the implementation of a write request applied to a memory tag utilising the processor of the embodiment of the present invention in FIG. 9.

The steps of the procedure shown in FIG. 11 are identical to the steps in FIG. 8 up to and including function box 826.

If in function box 826, the CRC register 224 determines that the header portion, for example portion 402 of data packet 1000, has been received correctly, the processor 900 now needs to check the integrity of each of the data segments 1021, 1022 and 1023 in the payload section 1006 of the packet 1000.

Register E 222 is loaded with a twelfth count value, N12, by the micro sequencer and instruction decoder 202 in function box 1102. Register F is enabled (function box 1104) so that each data segment 1021, 1022, 1023 in the payload section 1006 can be latched, in turn, into register F.

Register E 222 is controlled to decrement the value stored on it on each subsequent cycle (function box 1106). Whilst the count exceeds zero, the data that is being input into the processor is latched into register F 910. This is shown in function box 1108. Once count N12 has been decremented to equal zero, register E 222 flags the micro sequencer and instruction decoder 202. The micro sequencer and instruction decoder 202 now know that an entire data segment 1021, 1022 or 1023 from the payload section 1006 has been fully received. In the preferred embodiment, N12 is set to 30 clock cycles. 30 clock cycles is sufficient, in the preferred embodiment, for each data segment 1021, 1022, 1023 to be read into the processor.

In order that cyclic redundancy checking can be completed, it is necessary also for the processor to read in and process the cyclic redundancy check field 1041, 1042, 1043 (containing the checksum) for the data segment which has just be latched into register F 910.

Hence, register E 222 is loaded with a thirteenth count value, N13, by the micro sequencer and instruction decoder 202. Register E 222 is also controlled to decrement the value stored on it on each subsequent cycle (function box 1110). Whilst the count exceeds zero, the data that is being input into the processor is latched into the CRC register 224, which continues to carry out cyclic redundancy checking on that data by latching in and processing the CRC field 1041, 1042, 1043 for the data segment which has just been latched into register F 910. This is shown in function boxes 1112 and 1114. Once count N13 has been decremented to equal zero, register E 222 flags the micro sequencer and instruction decoder 202 as described above. The micro sequencer and instruction decoder 202 knows that a CRC field 1041, 1042, 1043 for the data segment latched into register F has been fully received and that the CRC register 224 has completed cyclic redundancy checking on the received data. In the preferred embodiment, N13 is set to 30 clock cycles. 30 clock cycles is sufficient, in the preferred embodiment, for the CRC field to be read into the processor and for the cyclic redundancy check to be completed by CRC register 224.

Once the cyclic redundancy check has been completed, the micro sequencer and instruction decoder 202 checks the flag that is returned to it by the CRC register 224. In a preferred embodiment, a logical low flag is returned if cyclic redundancy checking indicates that the data segment latched into register F is incorrect. Otherwise, a logical high flag is returned.

In function box 1116 the micro sequencer and instruction decoder 202 determines whether the CRC register 224 has indicated that the data segment latched into register F is correct or not. If it is not, the process is caused by the read routine instructions to move into the hyper jump unit where jump vector fail is adopted as the next instruction. This causes the routine to branch to the address at which a NACK routine is stored. A NACK routine is executed sending a NACK message back to the device which sent the packet to the processor. This message is then dealt with in that device or host in the normal way. For example, the packet may be re-sent, or an error message may be displayed to a user thereof. The action taken in the event of the CRC register 224 returning a flag indicating that the header has not been correctly received is presented in function box 1118. In this way, if, for example, the processor is connected to flash memory for writing data in the payload section 1006 into the flash memory, no data is written into the flash memory if any one of the data segments 1021, 1022, 1023 are incorrectly received by the processor.

Data is now written to the memory as follows. The address at which the write operation is to commence is present in register A 206. The length or amount of the remaining data that is to be written for the entire payload section 1006 is present in register B 212. The micro sequencer and instruction decoder 202, in accordance with instructions received from the instruction region 204a of program memory 204 therefore controls writing of the data segment latched into register F 910 into the memory, for example data segment 1021 in payload segment 406, in a bitwise fashion per clock cycle (function box 1120). Once the byte of in the data segment has been written into the memory associated with the processor 900, the address stored in register A 206 is incremented by the number of bits that have been written (in the sequence of addresses within the memory) (function box 1122) and the length value in register B 212 is decremented by the number of bits that have been written (function box 1124). In the preferred embodiment, one byte (i.e. eight bits) is written on each writing step (function box 1120).

At this stage, so long as the length value is not equal to zero (function box 1126), the write procedure from function box 1102 is repeated. When the length value reaches zero, register B sends a flag indicative of this to the micro sequencer and instruction decoder 202.

At this point in the process, the processor 900 knows that the number of bytes of data instructed to be written in the received instruction packet 1000 have been checked for integrity and loaded into the memory in turn. Hence, the micro sequencer and instruction decoder 202 is instructed to jump to an acknowledgement routine stored in the program memory 204 at an address specified in the instructions (function box 1128). Here an acknowledgement message indicating correct receipt of the payload data is transmitted back to the host device.

FIG. 12 shows the processor 200, 900 of the present invention in an exemplary setting—as the central processing unit for a memory tag 1200. The memory tag 1200 includes an area of non-volatile memory 1204, such as Ferro Electric Random Access Memory (FRAM), Flash Memory or Read Only Memory (ROM). This memory 1204 is controlled by the processor 200, 900 of the present invention in the manner described in detail above. The memory tag 1200 also includes an RF coder/decoder 1206 which codes data for transmission (via inductive coupling between an antenna 1208 in the memory tag 1200 and an antenna in a memory tag interrogator 1202) out of the memory tag, and equally decodes RF data transmitted to the memory tag from the memory tag interrogator 1202.

When data stored in the memory tag 1200 is to be read, for example, by the interrogator 1202, the interrogator 1202 is brought into close proximity with the tag 1200 thus causing it to power up as discussed above. The interrogator 1202 and memory tag 1200 couple inductively, using radio frequency (RF) band communication, to allow the transfer of power, instructions and data between them. Signals may, for example, be transmitted using load modulation.

The interrogator 1202 comprises an RF transceiver 1250 which can communicate using radio frequency (RF) band communication with the RF coder/decoder 1206 of the memory tag 1200. The interrogator 1202 also comprises an interrogator processor 1252 which is hard-wired to the transceiver 1250. The interrogator 1202 initialises communication with the memory tag 1200 by reading configuration data from the memory tag 1200. The configuration data includes information on the read and write timing cycles of the non-volatile memory 1204. The interrogator processor 1252 formats data which is to be written into the non-volatile memory 1204 in accordance with the received configuration data into a data packet 1000 (as described above). The interrogator processor 1252 can adjust the length of the padding field 1031, 1032 and 1033 so that the data packet 1000 is formatted in such a way that the data segments 1021, 1022 and 1023 can be written directly into the non-volatile memory as they are received by the processor 900.

A feature of the memory tags preferably employed is their size. Each memory tag is preferably approximately 2 mm² in size and has a capacity of approximately 1 Mbit or more. Input and output to the memory tag is via close range coupling. In this sense, close range means approximately 3 to 4 mm or less, or more preferably 1.5 mm. Of course, memory tags having other dimensions, capacities and ranges may equally be used in the present invention, as may tags that operate outside the RF frequency band.

It will be noted that the present invention has been described in the setting of a memory tag in which there is a requirement to minimise the silicon (or other appropriate material) footprint of the processor such that the amount of silicon, or the like, which can be devoted to memory is maximised. However, as already stated, the processor of the invention may be utilised in other applications and certainly in applications in which footprint minimisation is not an issue. In such embodiments, it is well within the scope of the invention to utilise forward error correction. When utilising forward error correction, the host will send a data/instruction packet to the processor a number of times. The cyclic redundancy check will be carried out on these packets in the order in which they are received. In forward error correction, it is assumed that the cyclic redundancy check will indicate that at least one of the multiple versions of the packet that is transmitted has been validly receives. If it has not, that data is simply missed.

It will of course be understood that the present invention has been described above by way of example only, and that modifications of detail can be made within the scope of the invention.

The invention claimed is:

1. A processor for writing data contained in payload data of a data packet to memory, comprising:
   - a first register configured to receive first data corresponding to a first segment of payload data of a data packet, and further configured to latch the first data corresponding to the data segment;
   - a second register configured to receive second data corresponding to a second segment of the payload data of the data packet, and further configured to establish validity of the first data latched into the first register before the first data is written to a memory;
   - a micro sequencer and instruction decoder module configured to control transfer of the first data to the memory, wherein each of the first and second registers is controlled by the micro sequencer and instruction decoder module;
   - a third register configured to latch third data representing an address in the memory; and
   - a fourth register configured to latch fourth data indicating an amount of data in the payload data for transferring to the memory,
   wherein each of the third and fourth registers is controlled by the micro sequencer and instruction decoder module.

2. The processor according to claim 1, wherein the micro sequencer and instruction decoder module is configured to control the writing of the first data to the memory, wherein the first data is written to the address specified in the third register once the first data has been validated by the second register.

3. The processor according to claim 2, wherein the micro sequencer and instruction decoder module is configured to:
   - control the first register to latch first data corresponding to further first segments of the payload data of the data packet;
   - control the second register to receive second data corresponding to further second segments of the payload data of the data packet;
   - control the second register to establish validity of the first data corresponding to the further first segments before the first data is written to memory; and
   - control the first register and second register to continue processing the first data and second data until the amount of data from the payload data specified in the fourth register has been written to memory.

4. The processor according to claim 3, wherein the micro sequencer and instruction decoder module is configured to increment the third register following each writing of the first data.

5. The processor according to claim 1, wherein the segment of payload data is a part of the amount of data.

6. A memory tag for receiving data, comprising:
   - a data register configured to receive a first segment of the data and a second segment of the data, wherein of the data register receives the first segment of data before the data register receives the second segment of data; and
   - an array of non-volatile memory configured to receive the first segment of the data, wherein the non-volatile memory receives the first segment of data from the data register before the data register receives the second segment of data, and
   wherein the data register is cleared after the non-volatile memory has received the first segment of the data and before the data register receives the second segment of data; and
   - a processor configured to establish the validity of the first segment of the data before writing the first segment of the data into the array of non-volatile memory.

7. The memory tag according to claim 6, wherein padding data separates the first segment of the data from the second segment of the data.

8. The memory tag according to claim 6, wherein the padding data comprises null data, and wherein the data register is cleared by receiving the padding data into the data register.

9. The memory tag according to claim 6, wherein the first segment of the data and the second segment of the data are one byte in length.

* * * * *